(12) United States Patent
Bradbury et al.

(10) Patent No.: US 12,199,973 B2
(45) Date of Patent: Jan. 14, 2025

(54) SECURED AUTHORIZATION FOR DEMAND RESPONSE

(71) Applicant: ITRON, INC., Liberty Lake, WA (US)

(72) Inventors: Connie Bradbury, Broomfield, CO (US); Benjamin N. Damm, Point Roberts, WA (US); Aaron Glasenapp, Denver, CO (US); Thomas J. Barbour, Evergreen, CO (US); Donald Lloyd Reeves, III, Pleasanton, CA (US)

(73) Assignee: ITRON, INC., Liberty Lake, WA (US)

(*) Notice: Subject to any disclaimer, the term of this patent is extended or adjusted under 35 U.S.C. 154(b) by 299 days.

(21) Appl. No.: 17/743,308

(22) Filed: May 12, 2022

(65) Prior Publication Data
US 2023/0370445 A1 Nov. 16, 2023

(51) Int. Cl.
H04L 9/40 (2022.01)
(52) U.S. Cl.
CPC ............ H04L 63/083 (2013.01); H04L 63/20 (2013.01)
(58) Field of Classification Search
CPC ..... G06Q 50/06; H02J 3/144; H04L 63/0823; H04L 63/0861; H04L 63/10; H04L 63/12; H04L 63/20; H04L 9/3247
See application file for complete search history.

(56) References Cited

U.S. PATENT DOCUMENTS

| | | | |
|---|---|---|---|
| 10,609,562 B2 | 3/2020 | Vaswani et al. | |
| 2012/0116602 A1 | 5/2012 | Vaswani et al. | |
| 2014/0277795 A1 | 9/2014 | Matsuoka et al. | |
| 2016/0292205 A1 | 10/2016 | Massey et al. | |
| 2017/0169525 A1* | 6/2017 | Mokhtari | G06Q 10/06311 |
| 2021/0218579 A1* | 7/2021 | Ho | H04L 9/3263 |

OTHER PUBLICATIONS

CIP-002-5.1a, "Cyber Security—BES Cyber System Categorization", 37 pages.
CIP-003-8, "Cyber Security—Security Management Controls", 59 pages.
CIP-004-6, "Cyber Security—Personnel & Training", 46 pages.
CIP-005-6, "Cyber Security—Electronic Security Perimeter(s)", 23 pages.

(Continued)

Primary Examiner — Olugbenga O Idowu
(74) Attorney, Agent, or Firm — Artegis Law Group, LLP

(57) ABSTRACT

Various embodiments set forth a method comprising validating, by a first computing system in a secured computing environment, a demand event generated by an operator, where the operator is authenticated to generate demand events within the secured computing environment and the demand event corresponds to a set of endpoints operating outside the secured computing environment, generating, by the first computing system, an authorization permit associated with the demand event, and sending, from the first computing system to a second computing system outside of the secured computing environment, (i) an indicator of the demand event, and (ii) the authorization permit, where the demand event is usable by the second computing system to generate a demand event command for the set of endpoints, and the authorization permit is usable by the set of endpoints to validate the demand event command.

20 Claims, 8 Drawing Sheets

(56) References Cited

OTHER PUBLICATIONS

CIP-006-6, "Cyber Security—Physical Security of BES Cyber Systems", 32 pages.
CIP-007-6, "Cyber Security—System Security Management", 51 pages.
CIP-008-6, "Cyber Security—Incident Reporting and Response Planning", 24 pages.
CIP-009-6, "Cyber Security—Recovery Plans for BES Cyber Systems", 25 pages.
CIP-010-3, "Cyber Security—Configuration Change Management and Vulnerability Assessments", 47 pages.
CIP-011-2, "Cyber Security—Information Protection", 16 pages.
CIP-013-1, "Cyber Security—Supply Chain Risk Management", 13 pages.
CIP-014-2, "Physical Security", 36 pages.
Extended European Search Report for Application No. 23172983.1 dated Sep. 12, 2023.

\* cited by examiner

SECURED AUTHORIZATION FOR DEMAND RESPONSE

BACKGROUND

Field of the Various Embodiments

Various embodiments relate generally to control systems and, more specifically, to secured authorization for demand response.

Description of Related Art

A demand response management system (DRMS) controls a quantity of distributed energy resources (DERs), such as resources that produce energy and endpoint devices that consume energy. The demand response management system integrates transmission-and-distribution control infrastructure with command-and-control elements, enabling a centralized service to control how energy is distributed to a large number of consumers. During operation, the DRMS receives forecast information about energy production and energy demand in the near future and generates commands to control the operations of specific DERs such that the forecasted demand does not exceed the forecasted production. For example, the DRMS may determine that the forecasted energy production will not meet the forecasted demand in the upcoming 4-hour period; the DRMS can take action by performing a demand response, which reduces a quantity of energy that the endpoint devices consume. The change in the amount of energy required enables the centralized service to better respond to the forecasted energy supply and avoid issues with mismatched supply and demand (e.g., increased production costs, blackouts, brownouts, etc.).

The DRMS controls endpoint devices by generating a demand response control (DRC) event. The demand response control event includes a set of distinct commands to control the operation of a set of endpoint devices that consume energy. A given endpoint device receives a command for a specific power control action (e.g., reduce energy consumption by 1 kW for 1 hour) and executes the commanded action, thereby reducing the energy demand created by the endpoint device. The DRMS controls the parameters of a given demand event in order to ensure that the group of endpoint devices contribute to the overall demand response.

In some instances, the endpoint device can receive commands associated with unauthorized or improper demand response control events. When endpoint devices perform actions specified in the unintentional demand response, the changes in energy demand impact the electrical system as a whole. In such instances, the DRMS may not effectively generate and manage a demand response, resulting in issues for consumers of the electrical system.

BRIEF DESCRIPTION OF THE DRAWINGS

Various embodiments of inventive concepts are disclosed herein with reference to the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Overview

Figure 1:
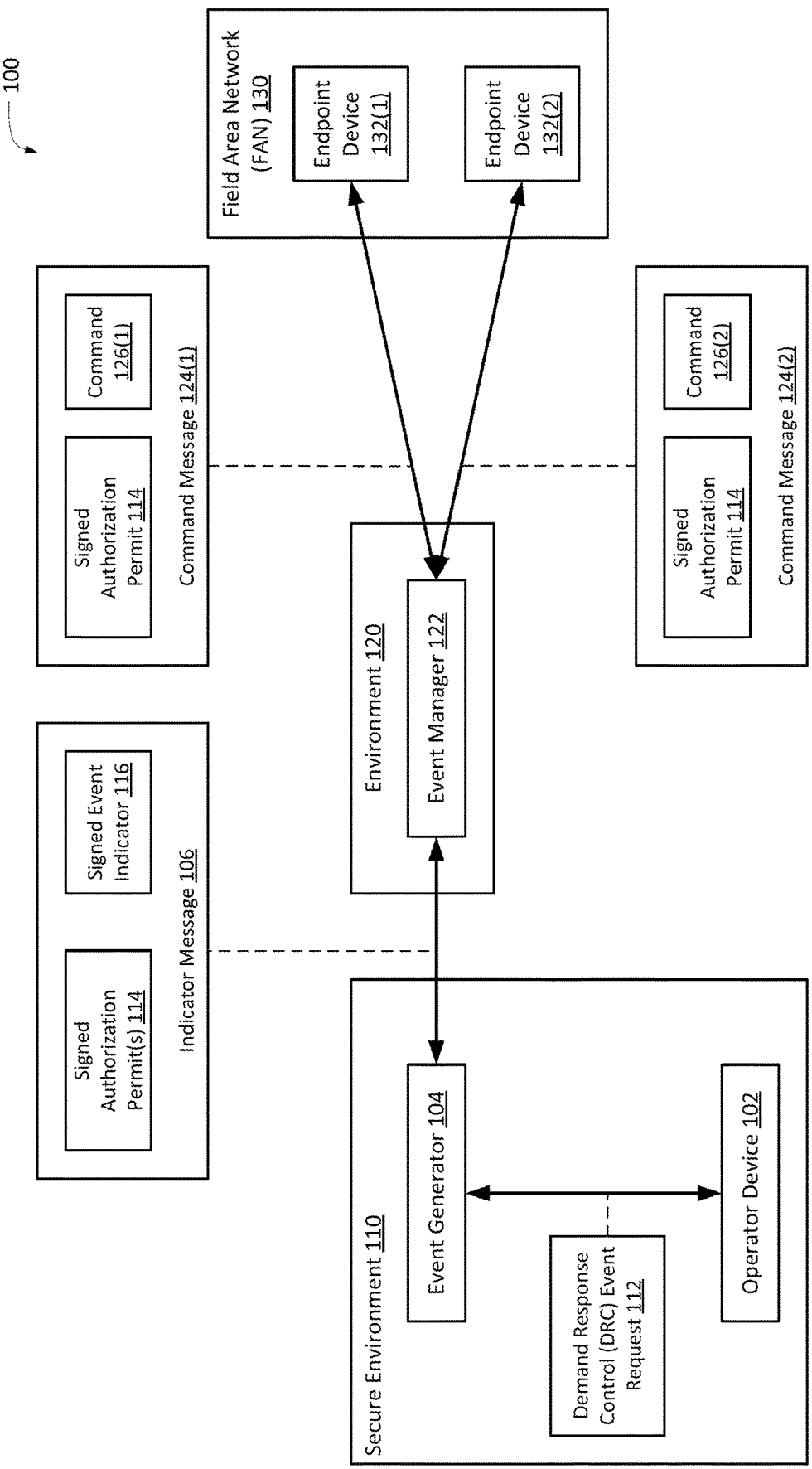
FIG. 1 is a block diagram illustrating a secure demand response management system for generating secure demand response control events, according to various embodiments.

A demand response management system (DRMS) controls a quantity of distributed energy resources (DERs), which include various endpoint devices that consume energy. An operator of a DRMS generates demand response control (DRC) events that control the amount of energy that a group of endpoint devices consume, thereby controlling the energy demand that such endpoint devices place on an electrical grid. The DRMS controls the parameters of a given DRC event in order to specify the individual commands included the DRC event, where distinct commands are sent to the endpoint devices.

In some instances, an endpoint device can receive commands associated with an invalid DRC event. As referred to herein, an "invalid DRC event" can include any DRC event that the endpoint devices should not execute and includes, but is not limited to, unintentional DRC events, and unauthorized DRC events. Example unintentional DRC events can include, without limitation, an operator mistakenly entering a DRC event, such as inputting an incorrectly large quantity of power to shed, or an error in the DRMS system that initiates a DRC event without instructions from an operator. Example unauthorized DRC events can include, without limitation, an unauthenticated operator entering a DRC event, unauthorized control of endpoints or amount of power to shed (e.g., 10 MW vs. 1000 kW) by an authorized operator, or a malicious actor entering a DRC event or individual power control commands during an attack (e.g., a man-in-the-middle attack).

When the endpoint device performs the commanded actions from the unintentional or unauthorized DRC event, the changes in the power demand negatively impact the electrical system as a whole and interfere with the operation of the endpoint device. In such instances, the DRMS does not effectively manage the endpoint device, resulting in issues for consumers of the electrical system (e.g., sudden loss of power to devices, system brownouts, excessive costs for power usage within a time period, and so forth). Typical approaches for avoiding unintentional or unauthorized DRC events include protocols that impose security protections on demand response management systems when generating and executing a DRC event. For example, the North American Electric Reliability Corporation (NERC) has set a set of critical infrastructure protection (CIP) rules that strictly regulate the human operators and devices that can manage DRC events. Some rules imposed on demand response management systems, however, cause difficulties when managing certain bulk electrical grids and endpoint devices. For example, some NERC-CIP rules require a DRMS that manages a large number of endpoint devices to implement a suite of expensive cyber-security protections. Implementing the cyber-security protections in the prescribed manner limits the feasibility that a DRMS can effectively manage a large number of endpoint devices.

As discussed below, the above problems can be ameliorated through a secure DRMS that includes an event generator in a secure environment that transmits secure messages attesting to the authenticity of DRC events generated within the secure environment. Downstream devices outside the secure environment can authenticate the secure message to determine whether a DRC event was generated within the secure environment. For example, the DRMS authenticates a human operator managing a DRC event. When an authenticated human operator generates a DRC event request, the event generator checks the DRC event request with an DRC event policy. When the event generator determines that the DRC event request adheres to the DRC event policy, the event generator creates a DRC event that includes an event indication of parameters specified in the DRC event request. The event generator uses a private key to sign the event indication. The event generator also uses a private key to sign one or more authorization permits.

The event generator generates an indicator message including the signed authorization permit and the signed event indication. The event generator transmits the indicator message outside the secure environment, where an event manager uses a public key to authenticate the indicator message. The event manager generates distinct commands for the respective endpoint devices involved in the DRC event. The event manager generates command messages for each of the respective endpoint devices. In some embodiments, the command messages further include the signed authorization permit generated by the event generator; alternatively, the event manager can transmit the signed authorization permit in separate messages to the respective endpoint devices or set of endpoint devices. The respective endpoint devices receive a command message and uses the public key to authenticate the signed authorization permit before performing the operation specified in the command.

At least one technical advantage of the disclosed techniques is that, with the disclosed techniques, a secure DRMS can indicate to devices outside of the secure environment that a given DRC event is generated by an authenticated operator and adhere to a DRC event policy. In particular, because the secure DRMS can send secure messages to devices outside of the secure environment while ensuring the authenticity of a given DRC event, fewer devices need to be within the secure environment while maintaining security protocols associated with demand events. Reducing the number of devices that are required to be included in the secure environment reduces the cost and complexity associated with maintaining a secure environment among distributed devices. Further, the secure DRMS can control a large quantity of endpoint devices while complying with various security protocols, such as the NERC-CIP rules. Further, by using the disclosed techniques, one or more event managers can provide commands for DRC events outside the secure environment, enabling the system to be scalable by adding more event managers to handle large numbers of endpoint devices.

In the following description, numerous specific details are set forth to provide a more thorough understanding of the various embodiments. However, it will be apparent to one skilled in the art that the inventive concepts may be practiced without one or more of these specific details.

Secure Demand Response Management System

In various embodiments, a secure demand response management system within a secure environment generates secure demand response control events that can be authenticated by downstream devices outside of the secure environment. As discussed in further detail below, an event generator included in a secure environment authenticates operators and processes demand response control event requests submitted by the operators. The demand response control event controls a set of endpoint devices consuming power that is generated by producing devices within a bulk electrical grid. The event generator checks the request with a demand response control event policy to determine whether parameters included in the request adhere to the policy.

In various embodiments, upon determining that the event adheres to the policy, the event generator can create a demand response control event that includes an event indicator. In some embodiments, the event generator can use a private key to sign the event indication. Additionally or alternatively, in some embodiments, the event generator can use the same or a different private key to sign one or more authorization permits issued to the set of endpoint devices. In instances when the event generator signs one or both of the event indicator and the authorization permits, the event generator can transmit the signed event indication and the one or more signed authorization permits to the event manager. In various embodiments, the event manager can use a corresponding key (e.g., a public key paired to the private key used by the event generator) to authenticate the indicator message, generate a corresponding set of commands for a set of endpoint devices, and transmit the commands and/or the one or more signed authorization permits to the set of endpoint devices. In various embodiments, the set of endpoint devices can receive a signed authorization permit and/or a command. In various embodiments, upon receiving the signed authorization permit, a given endpoint device can use corresponding key to authenticate the received signed authorization permit. In such instances, the given endpoint device can use the authenticated authorization permit to validate the command. Upon successful validation of the command, the given endpoint device can perform power control operations specified in the command.

By authenticating the human operator generating a demand response control event request and confirming that the request adheres to a demand response control event policy, the event generator can successfully ensure that demand response control events are intentionally created and valid. Further, by signing components of a demand response control event, the event generator can successfully indicate that the demand response control event was generated within the secure environment without requiring downstream devices also be included in the secure environment. Accordingly, the secure demand response management system is able to securely manage large quantities of endpoint devices that are located outside the secure environment, reducing the costs and resources associated with managing compliant devices within the secure environment.

As an example, a human operator provides biometric data as credentials to access the event generator. The event generator authenticates the biometric data and provides access to the operator. The operator provides a demand response control event request that includes one or more parameters, such as reducing energy demand of 100 endpoint devices by 1 MW over 1 hour. When the event generator processes the demand response control event request, the event generator refers to a stored event policy to ensure that the parameters of the demand response control event request adhere to the event policy (e.g., whether the proposed rate or volume of the reduction is unsafe). Upon confirming that the request is valid, the event generator creates a demand response control event that includes the parameters of the request. The generated demand response control event includes multiple components, such as an indication of the event, and one or more authorization permits, which endpoints outside the secure environment use to validate a specific command associated with the demand response control event. The event generator signs the event indication and the authorization permit with a private key to generate a signed event indicator uses the same or a different private key to generate a signed authorization permit. The event generator creates an indicator message that includes the signed event indication and the signed authorization permit.

An event manager in an environment outside the secure environment uses a public key to authenticate the signed event indication and processes the event indication. In some embodiments, the event manager receives metadata from one or more data sources to modify specific parameters of the demand response control event. The event manager also creates specific commands to send to each of the endpoint devices. Each command may be distinct to each endpoint. For example, the device manager could generate a first command specifying that a first endpoint device reduce energy demand by 10 kW for 1 hour and a second command specifying that a second endpoint device reduce energy by 50 kW for 1 hour. The event manager generates separate command messages for each endpoint device, where the command message includes the command and the signed authorization permit. The endpoint device receives the command message and uses a public key to authenticate the signed authorization permit. Upon authenticating the signed authorization permit, the endpoint device validates that command using the signed authorization permit and then processes the command to perform the commanded action.

As a result, endpoint devices located outside of the secure environment can successfully authenticate commands associated with a demand response control event that is created inside the secure environment. Accordingly, a secure demand response control system implementing the disclosed techniques can securely communicate with large quantities of endpoint devices located outside of the secure environment while maintaining security protocols associated with demand response control events.

FIG. 1 is a block diagram illustrating a secure demand response management system 100 for generating secure demand response control events, according to various embodiments. As shown, and without limitation, the secure demand response management system 100 includes a secure environment 110, an environment 120, a field area network (FAN) 130, an indicator message 106, and command messages 124. The secure environment 110 includes, without limitation, an operator device 102, an event generator 104, and a demand response control (DRC) event request 112. The environment 120 includes, without limitation, an event manager 122. The FAN 130 includes, without limitation, endpoint devices 132 (e.g., 132(1), 132(2)). The indicator message 106 includes, without limitation, one or more signed authorization permits 114 and a signed event indicator 116. The command messages 124 (e.g., 124(1), 124(4)) respectively include one of the signed authorization permits 114 (e.g., 114(1), 114(2)) and a command 126 (e.g., 126(1), 126(2)).

For explanatory purposes, multiple instances of like objects are denoted with reference numbers identifying the object and additional number in parentheses identifying the instance where needed. Further, the secure demand response management system 100 includes multiple instances of elements, even when not shown. For example, the secure demand response management system 100 can include multiple operator devices 102 (e.g., 102(1), 102(2), 102(3), etc.), event generators 104 (e.g., 104(1), 104(2), 104(3), etc.), event managers 122 (e.g., 122(1), 122(2), 122(3), etc.), and/or endpoint devices 132 (e.g., 132(1), 132(2), 132(3), etc.), and still be within the scope of the disclosed embodiments.

In operation, the event generator 104 within the secure environment 110 authenticates an operator who is using the operator device 102. The authenticated operator generates a DRC event request 112. The event generator 104 determines whether the DRC event request 112 adheres to a DRC event policy. When the event generator 104 determines that the DRC event request 112 adheres to the DRC event policy, the event generator 104 produces a DRC event that includes an event indicator that identifies a set of DRC event parameters. The event generator 104 also generates one or more authorization permits, which downstream devices use to validate that an operation was authorized by the event generator 104. The event generator 104 uses a private key to sign the event indicator and uses the same or a different private key to sign each of the one or more the authorization permits to generate the signed event indicator 116 and the signed authorization permit(s) 114, respectively. The event generator 104 produces an indicator message 106 that includes the one or more signed authorization permits 114 and the signed event indicator 116 and transmits the indicator message 106 to the event manager 122 included in the environment 120.

The event manager 122 uses a corresponding public key to authenticate the signature of the signed event indicator 116 and determines the DRC event parameters from the signed event indicator 116. The event manager 122 generates command messages 124 for each of the respective endpoint devices 132 involved in the DRC event. The event manager 122 generates distinct commands 126 specifying a specific power control action that a given endpoint device 132 is to perform. The event manager 122 includes the command 126, along with one of the one or more signed authorization permits 114, in a command message 124 that is transmitted to the given endpoint device 132. The given endpoint device 132 authenticates the signature of the signed authorization permit 114 using the public key. Upon authenticating the signed authorization permit 114, the endpoint device 132 uses the authenticated authorization permit 114 to validate the command 126 and performs the operation specified in the command 126.

The secure environment 110 controls the storage and use of information by devices within the environment. In various embodiments, the secure environment 110 can satisfy various security policies that specify rules for computer network access. Additionally or alternatively, in some embodiments, the secure environment 110 can be a secured network of one or more devices, such as the operator device 102 and/or the event generator 104, that comply with various security protocols imposed within the secured network. For example, the NERC has specified a security policy that includes a set of CIP rules for devices that affect the bulk electrical grid. Such rules specify that devices maintain secure communications between devices associated with controlling power for bulk electrical systems (BES), such as a bulk electrical grid. The CIP rules are included in one or more standards comprising, without limitation: (i) CIP-002-5.1a: Cyber Security—BES Cyber System Categorization, (ii) CIP-003-8: Cyber Security—Security Management Controls, (iii) CIP-004-6: Cyber Security—Personnel & Training, (iv) CIP-005-6: Cyber Security—Electronic Security Perimeter(s), (v) CIP-006-6: Cyber Security—Physical Security of BES Cyber Systems, (vi) CIP-007-6: Cyber Security—System Security Management, (vii) CIP-008-6: Cyber Security—Incident Reporting and Response Planning, (viii) CIP-009-6: Cyber Security—Recovery Plans for BES Cyber Systems, (ix) CIP-010-3: Cyber Security—Configuration Change Management and Vulnerability Assessments, (x) CIP-011-2: Cyber Security—Information Protection, (xi) CIP-013-1: Cyber Security—Supply Chains Risk Management, and (xii) CIP-014-2: Physical Security.

For example, some of the CIP cyber security rules (see, e.g., CIP-003-08, CIP-007-6) specify various physical security controls (e.g., entities are to control physical access to BES cyber systems and cyber assets that provide electronic asset controls) and/or electronic access controls (e.g., limiting inbound/outbound electronic access between devices outside the secure environment 110 and devices within the secure environment 110, authentication of all dial-up connectivity, etc.) to ensure that devices controlling a BES remain secure, In such instances, the secure environment 110 includes control systems that manage various devices in a smart grid (e.g., connected switches and/or other power controllers associated with the endpoint devices 132) while limiting connectivity and/or communication with devices that are outside the secure environment 110.

The operator device 102 is a secure device within the secure environment 110 that manages demand responses. In various embodiments, a human operator can use the operator device to access various interfaces to connect to the event generator 104 to manage demand responses. In some embodiments, the operator device 102 can include one or more components that automate the management of demand responses. In some embodiments, the operator device 102 can include various input components that collect security data (e.g., authorization codes passwords, etc.) and/or biometric data from a human operator. In such instances, the operator device 102 can transmit security data and/or the biometric data as user credentials to establish the human operator as an authorized user before the human operator can access the event generator 104. Upon authentication, the human operator can access the event generator 104 via the operator device 102 and can manage demand response control events and/or generate the demand response control event request 112.

The DRC event request 112 initiates the event generator 104 to create a demand response control event. In various embodiments, the human operator can use the operator device 102 create a specific DRC event by generating a DRC event request 112 that includes a set of DRC event parameters. The set of DRC event parameters manage the energy demands of a set of endpoint devices 132. In some embodiments, the DRC event request 112 can specify an overall demand response for the set of endpoint devices 132 as part of the DRC event. For example, the DRC event request 112 can include a set of DRC parameters that specify that a set of endpoint devices 132 collectively reduce demand by 2000 kW over 20 minutes. Additionally or alternatively, the DRC event request 112 can specify specific power control operations for specific endpoint devices 132. For example, the DRC event request 112 can specify that the endpoint device 132(1) reduce demand by 1 kW/sec until demand is 0 W and remain at this level for 15 minutes. In such instances, the event manager 122 can generate specific commands 126 based on the DRC event parameters that were included in the DRC event request 112.

The event generator 104 includes one or more devices in the secure environment 110 that serve as a head-end remote service management (RSM) policy service. In various embodiments, the event generator processes the DRC event request 112 and generates a corresponding DRC event. In various embodiments, the event generator 104 can create the indicator message 106 that includes components associated with the DRC event. In some embodiments, when processing the DRC event request 112, the event generator 104 can process the DRC event request 112 against one or more rules of a DRC event policy to determine whether the DRC event parameters adhere to the DRC event policy. For example, a DRC event policy could specify limits to how much power can be shed and/or how fast (e.g., maximum slope) power can be shed during a given DRC event (e.g., 300 MW over 15 minutes), how many devices that are actively shedding power, etc. Some other policy characteristics can include, without limitation, the rate of power shed and cancellations within a time period, a time range that an authorization permit is valid, and so forth. In such instances the event generator can compare the DRC event parameters with the DRC event policy to determine whether the request sheds an excessive amount of power within a time period or would involve a quantity of endpoint devices 132 that exceed a threshold specified in the DRC event policy. In such instances, the event generator 104 could reject the DRC event request 112 upon determining that one or more DRC event parameters included in the DRC event request 112 do not adhere to the DRC event policy.

Upon determining that the DRC event request 112 adheres to the DRC event policy, the event generator 104 produces an event indicator describing the DRC event parameters and uses a private key to generate the signed event indicator 116. In various embodiments, the event generator 104 also generates one or more authorization permits. The event generator 104 uses the same private key or a different private key to sign the one or more authorization permits to generate the one or more signed authorization permits 114. In some embodiments, the event generator 104 can generate a single signed authorization permit 114 that each endpoint device 132 uses to authenticate that the event generator 104 generated the signed authorization permit 114. Alternatively, in some embodiments, the event generator 104 can generate multiple signed authorization permits 114 for multiple partitions. For example, the event generator 104 can generate a distinct signed authorization permit 114 for each endpoint device 132 (e.g., the signed authorization permit 114(1) for the endpoint device 132(1), the signed authorization permit 114(2) for the endpoint device 132(2), etc.).

The event generator 104 generates the indicator message 106 that includes the signed event indicator 116 and the one or more signed authorization permits 114 and transmits the indicator message 106 to the event manager 122 in the environment 120 via a secure communication channel. For example, the event generator 104 can establish a hypertext transfer protocol transport layer security (HTTP-TLS) tunnel with the event manager 122, where the HTTP-TLS tunnel uses 128-bit or 256-bit encryption. In such instances, one or more routers (not shown) can forward the indicator message 106. In various embodiments, other types of secure communications channels (e.g., secure socket layer (SSL) encryption, Internet Protocol security (IPsec) tunnels, etc.) can be used.

The environment 120 is an environment separate from the secure environment 110. In various embodiments, the environment 120 can be a second network outside the network forming the secure environment 110. For example, the environment 120 can include a set of devices that comply with a different set of security protocols than the devices within the secure environment 110. In various embodiments, the environment 120 can include one or more devices or services, such as the event manager 122 and/or various data sources that provide various data associated with energy distribution.

The event manager 122 processes the indicator message 106 and generates one or more commands 126 (e.g., 126(1), 126(2)) for the set of endpoint device 132 involved the in DRC event. In various embodiments, the event manager 122 can acquire a public key paired to the private key used by the event generator 104 when signing the signed event indicator 116. In such instances, the event manager 122 can use the public key to authenticate the signature of the signed event indicator 116 as being the signature of the event generator 104; such an authentication indicates that the DRC event described by the signed event indicator 116 was validly generated by the event generator 104 within the secure environment 110.

In some embodiments, the event manager 122 can optionally use metadata from one or more data sources to determine device-specific commands 126 to achieve the demand response specified by the DRC event. For example, the event manager 122 can receive power usage data from an external data source that indicate a power usage forecast for a set of endpoint devices 132. In such instances, the event manager 122 can configure the device-specific commands 126 so as to cause the set of endpoint devices 132 to modify power operations such that the set of endpoint devices 132 collectively meet the DRC event parameters for future power usage.

In various embodiments, the event manager 122 can generate a set of command messages 124 that contain the signed authorization permit 114 and/or specific commands 126. In various embodiments, each command 126 can be an RSM command that specifies a specific power control action that the endpoint device 132 is to perform. For example, the command 126(1) could specify that the endpoint device 132(1) reduce demand by 1 kW/sec until the power demand is 0 W and remain at this level for 15 minutes, while the command 126(2) could specify that the endpoint device 132(2) reduce demand by 5 kW/sec until the power demand 1 kW and remain at this level for 1 hour.

In some embodiments, the event manager 122 can include a copy of a single signed authorization permit 114 in the command message 124. Alternatively, in some embodiments, the event manager 122 can include distinct signed authorization permits 114 (e.g., 114(1), 114(2), etc.) based on the intended target of the command message 124. For example, the event generator 104 can produce distinct device-specific signed authorization permits 114 corresponding to each endpoint device 132 (e.g., separate signed authorization permits specifying a permit for a specific endpoint device 132). In such instances, the event manager 122 can generate command messages 124, where a given command message 124 includes a device-specific signed authorization permit 114 and a device-specific command 126. Additionally or alternatively, the event manager 122 can send separate command messages 124 to each endpoint device 132. For example, the event manager 122 can transmit the signed authorization permit 114 in a command message. The event manager 122 can subsequently send the command 126 in an execution command message.

The field area network (FAN) 130 provides connectivity to a set of endpoint devices 132 (e.g., 132(1), 132(2), etc.). In various embodiments, the FAN 130 can further include various devices and/or nodes that provide connectivity to the endpoint devices 132. In some embodiments, one or more of the endpoint devices 132 can be distributed energy resources that consume power generated by a power provider. In some embodiments, each endpoint device 132 can include or be connected to a network device that receives communications via a communications channel and/or a power controller (e.g., power circuit, switch, connector, etc.) that controls the power that the endpoint device 132 consumes.

In some embodiments, the endpoint device 132 can receive the command message 124 over a secure communication channel and can authenticate the signature of the signed authorization permit 114 using the public key corresponding to the private key that the event generator 104 used to sign the signed authorization permit 114. In such instances, the endpoint device 132 successfully authenticating the signed authorization permit 114 enables the endpoint device 132 to use the authenticated authorization permit 114 to validate the command 126. In various embodiments, the endpoint device 132 can use the authenticated authorization permit 114 to validate that the corresponding command 126 is associated with a valid DRC event that the event generator 104 authorized within the secure environment 110. In some embodiments, upon validating the command 126, a power controller associated with the endpoint device 132 can execute the power control action specified in the command 126 in accordance with the DRC event.

Figure 2:
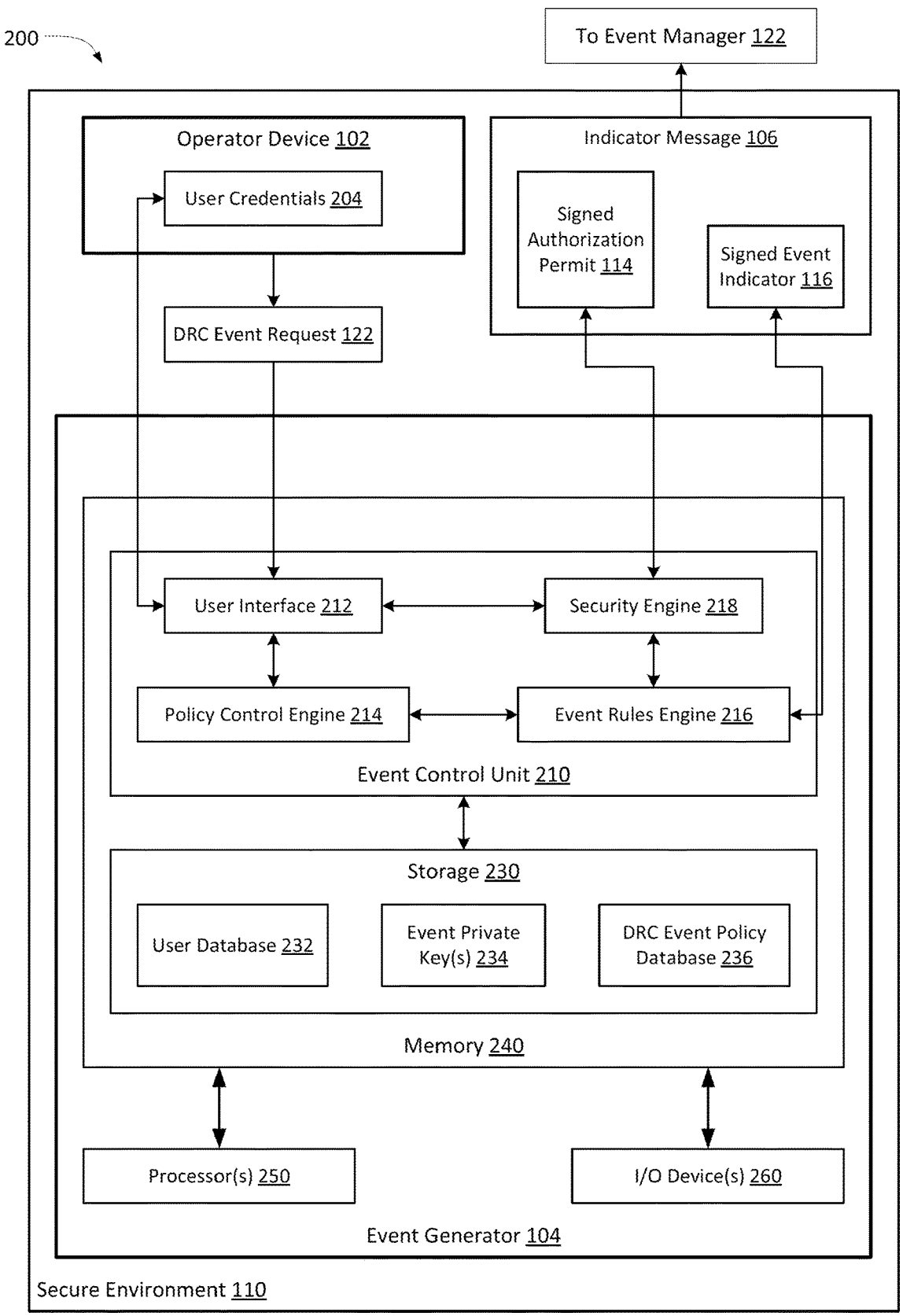
FIG. 2 is block diagram of the secure environment included in the secure demand response management system of FIG. 1, according to various embodiments.

FIG. 2 is block diagram 200 of the secure environment 110 included in the secure demand response management system 100 of FIG. 1, according to various embodiments. As shown, and without limitation, the secure environment 110 includes the secure environment 110 containing the operator device 102, the event generator 104, the indicator message 106, and the DRC event request 112. The operator device 102 includes, without limitation, user credentials 204. The event generator 104 includes, without limitation, a memory 240, processor(s) 250, and input/output (I/O) devices 260. The memory 240 includes, without limitation, an event control unit 210 and storage 230. The event control unit 210 includes, without limitation, a user interface (UI) 212, policy control engine 214, an event rules engine 216, and a security engine 218. The storage 230 includes a user database (DB) 232, an event private key 234, and a demand response control event policy DB 236.

In operation, the human operator provides the user credentials 204 to the operator device 102 to establish a trusted identity. The operator device 102 provides the user credentials 204 to the event control unit 210. The security engine 218 included in the event control unit 210 authenticates the human operator by comparing the user credentials 204 to authenticated user credentials that are stored in the user database 232. Upon successfully authenticating the human operator, the event generator 104 grants the human operator access to event generator 104 and grants the human operator permission to manage DRC event requests 112 and/or DRC event policies.

When the human operator manages a DRC event, the operator device 102 uses the user interface 212 to specify the DRC event request 112 for further processing by the event control unit 210. The event rules engine 216 in the event control unit 210 receives the DRC event request 112 and compares the DRC event request 112 to one or more DRC event policies stored in the DRC event policy DB 236. When the event rules engine 216 determines that the DRC event request 112 adheres to the one or more DRC event policies, the event rules engine 216 causes the event control unit 210 to generate a DRC event that includes the reviewed DRC event parameters. The DRC event includes an event indicator describing the DRC event parameters, as well as one or more authorization permits indicating that the event generator 104 approved the one or more endpoint devices 132 to perform power control operations associated with the DRC event. The event generator 104 uses the one or more event private key(s) 234 to sign the event indicator and the one or more authorization permits to, respectively, generate the signed event indicator 116 and the one or more signed authorization permits 114. The event generator 104 creates an indicator message 106 containing signed event indicator 116 and the one or more signed authorization permits 114 and transmits the indicator message 106 outside the secure environment 110.

The event generator 104 includes an event control unit 210 that manages the access of human operators to the DRC event policies and controls DRC event requests 112 generated by the human operator. In various embodiments, the event control unit 210 includes a security engine 218 that manages authentication and authorization techniques. The policy control engine 214 controls the DRC event policies that control how specific DRC events are executed. The event rules engine 216 performs rule-checking techniques to confirm whether DRC event requests 112 adhere to the DRC event policies.

In various embodiments, the operator device 102 can be a secure device within the secure environment 110 that a human operator uses to access the event generator 104 and manage DRC event policies and specific DRC events. In various embodiments, the operator device 102 can include one or more processors (not shown) and/or one or more memory subsystems (not shown). The one or more processors can run user processes (e.g., user authentication, demand response management, etc.) that enable the user to complete various tasks. In some embodiments, the operator device 102 can include various input and output components. For example, the operator device 102 can include one or more input components that collect biometric data from the human operator. In such instances, the operator device 102 can transmit the biometric data as the user credentials 204. Including biometric data to establish the identity of the human operator enables the event generator 104 to perform biometric authentication of specific human operators in accordance with one or more security protocols. Some other examples of authentication that the operator can provide include, without limitation, a user name and password, possession factors (e.g., chip reader, physical key, authentication key, etc.), device factors (e.g., device identifier. device location, cookie in web browser, etc.), and so forth.

In some embodiments, the operator device 102 can be remote to the event generator 104 and can establish a secure communications channel with the event generator 104. In some embodiments, the operator device 102 can provide a browser that enables the operator device 102 to run portions of the event generator 104 as a web service; in such instances, the operator device 102 can display one or more portions of the user interface 212 provided by the event generator 104 via the browser. In various embodiments, when generating the DRC event request 112, the human operator via the operator device 102 can specify one or more DRC event parameters that specify the characteristics of the DRC event that is to occur. In some embodiments, such DRC event parameters can include one or more of: identifiers for each endpoint device 132 in the set of endpoint devices that is included in the DRC event, start time, end time, rate of change, duration, duty cycle, media access control (MAC) addresses of each endpoint device 132, and so forth. In some embodiments, the DRC event request 112 can be in a specific format, such as a JavaScript Object Notation (JSON), eXtensible Markup Language (XML), and/or other formats.

In various embodiments, the event generator 104 can include one or more devices, such as one or more servers, and/or can be a service operating on one or more devices. For example, the event generator 104 can be a server that is compliant with the security protocols associated with the secure environment 110. In such instances, the security protocols can require that devices restrict access to the demand response control event policies and/or restrict the creation, extension, shortening, or deletion of specific DRC events. Such restrictions can be limited to specific human operators or specific operator roles that are authorized to access and manage the event policies and/or specific events.

In various embodiments, the security engine 218 included in the event control unit 210 can be a hardware security module (HSM) that performs various security operations, such as authenticating human operators and/or signing messages and data with cryptographic keys. In some embodiments, the security engine 218 can authenticate the human operator using the operator device 102 by authenticating the operator signature and/or other data included in the user credentials 204. For example, the security engine 218 can receive user credentials 204 that include biometric data and can compare the received biometric data with the biometric data of authorized users (stored in the user DB 232). In some embodiments, the event generator 104 can restrict access to the event generator 104 and/or restrict the processing of the DRC event requests 112 when the user authentication fails. Additionally or alternatively, the security engine 218 can use the event private key 234 to sign certain components, such as the event indicator and the authorization permit. In such instances, signing the authorization permit generates the signed authorization permit 114 and signing the event indicator generates the signed event indicator 116.

The policy control engine 214 receives requests to add, modify, and/or delete specific DRC event policies. In various embodiments, the policy control engine 214 stores specific DRC event policies in the DRC event policy DB 236. In such instances, the event rules engine 216 can compare a DRC event request 112 with the DRC event policies stored in the event rules engine 216 to determine whether the requested DRC event adheres to the one or more DRC event policies stored in the DB 236. Additionally or alternatively, the DRC event policy database 236 can store other information associated with a DRC event policy and/or a specific DRC event. For example, the DRC event policy DB 236 can include validated device metadata associated with the endpoint devices 132. For example, a stored DRC event policy can set thresholds on the minimum or maximum of quantity of a reduction in power demand, rate of reduction, time period, duty cycle, etc.

The event rules engine 216 can compare the DRC event request 112 with the one or more DRC event policies included in the DRC event policy DB 236 to determine whether to approve the DRC event request 112 and generate a DRC event. For example, the event generator 104 can compare the DRC event parameters included in the DRC event request 112 against one or more rules of a DRC event policy that is stored in the DRC event policy database 236. Performing the comparison includes determining whether each of the DRC parameters adheres to each rule of a given DRC event policy. When the event rules engine 216 determines that the DRC event request 112 does not adhere to the DRC event policy, the event generator 104 reject the DRC event request 112 and refrain from generating a DRC event. In other embodiments, in response to determining that the DRC event request 112 does not adhere to the DRC event policy, the event generator 104 is operable to suggest modifications to the DRC event 112 that would adhere to the DRC event policy (e.g., by suggesting a smaller reduction of power, a different time period for the reduction event, etc.).

In various embodiments, the event control unit 210 generates the DRC event corresponding to the DRC event request 112 upon determining that the DRC event request 112 adheres to the one or more DRC event policies. In some embodiments, the event control unit 210 generates the DRC event by generating (i) an event indicator describing the DRC event parameters and (ii) one or more authorization permits indicating that the event generator 104 authorized an endpoint device to perform a given operation. The security engine 218 signs the event indicator with the event private key 234. In some embodiments, the security engine can sign the one or more authorization permits with the same event private key 234 or a different event private key 234. Signing the event indicator generates the signed event indicator 116 and signing the authorization permit generates the signed authorization permit 114. In various embodiments, the signed authorization permit 114 can act as a secure token that indicates to other devices that the event generator 104 authorized a given device to participate in the DRC event. In such instances, devices can use one or more public keys paired to the one or more event private keys 234 in order to authenticate the signature of the event generator 104.

In some embodiments, the signed authorization permit 114 can correspond to a signed authorization permit that provides permission for multiple endpoint devices 132 to perform operations as part of the DRC event. For example, the event control unit 210 can generate an authorization permit that indicates that the event generator authorized two or more endpoint devices 132 to participate in the DRC event. In such instances, the security engine 218 can sign the authorization permit to generate a single signed authorization permit 114 that the two or more endpoint devices 132 authenticate before using the authenticated authorization permit 114 to validate a corresponding command and performing the respective commands 126 associated with the DRC event.

Alternatively, in some embodiments, the event control unit 210 can generate distinct authorization permits for distinct partitions and/or distinct endpoint devices 132. For example, in some embodiments, the event control unit 210 can generate a device-specific authorization permits for each endpoint device 132 involved in the DRC event. In such instances, the security engine 218 can sign each of the authorization permits to generate distinct device-specific signed authorization permits 114 for each of the endpoint device 132 (e.g., a signed authorization permit 114(1) for the endpoint device 132(1), a signed authorization permit 114(2) for the endpoint device 132(2), etc.). For example, the event generator 104 can generate a DRC event that controls a set of 500 endpoint devices 132. In such instances, the security engine 218 can sign 500 separately-generated authorization permits to generate 500 distinct signed authorization permits 114 (e.g., 114(1)-114(500)).

The indicator message 106 includes the one or more signed authorization permits 114 and/or the signed event indicator 116. In some embodiments, the event control unit 210 can include multiple signed authorization permits 114 in the indicator message 106. Following the example from above, after generating the 500 signed authorization permits 114, the event control unit 210 can include the 500 signed authorization permits 114 in a single indicator message 106, or alternatively multiple indicator messages 106. In various embodiments, the event control unit 210 can transmit the indicator message 106 to the event manager 122 via a secure communications channel. For example, the event generator 104 can transmit the indicator message 106 via a HTTP/TLS tunnel to the event manager 122. Alternatively, the event generator 104 can use different encryption techniques, such as SSL encryption and/or the like.

Figure 3:
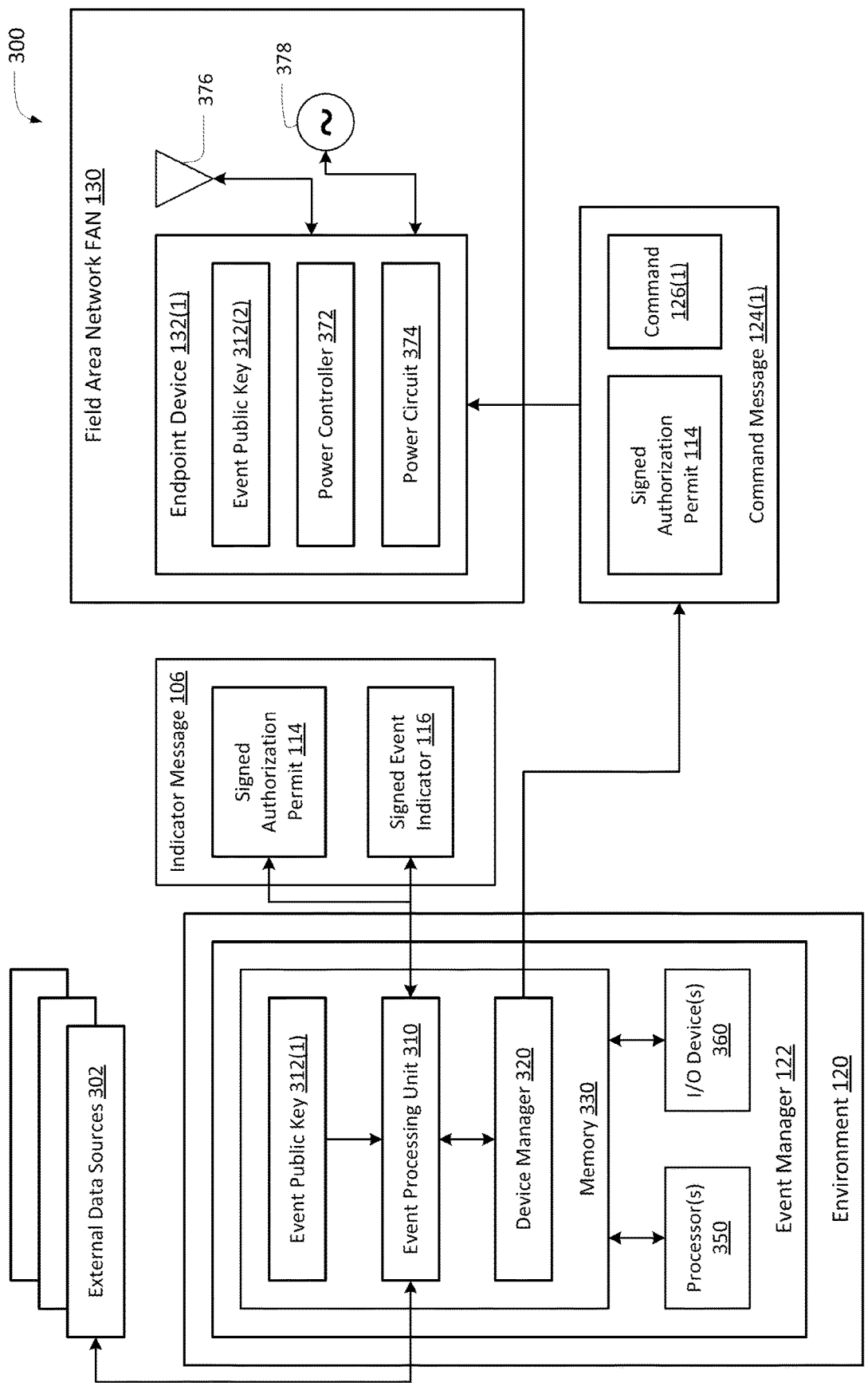
FIG. 3 is a block diagram illustrating the event manager included in the secure demand response management system of FIG. 1 transmitting a command message to an endpoint device, according to various embodiments.

FIG. 3 is a block diagram 300 illustrating the event manager 122 included in the secure demand response management system 100 of FIG. 1 transmitting a command message to an endpoint device, according to various embodiments. As shown, and without limitation, the block diagram 300 includes, without limitation, the environment 120, the field area network 130, the indicator message 106, the command message 124, and external data sources 302. The environment 120 includes, without limitation, the event manager 122, which includes, without limitation, memory 330, processor(s) 350, and I/O devices 360. The memory 330 includes, without limitation, an event processing unit 310, an event public key 312 and a device manager 320. The field area network 130 includes, without limitation, the endpoint device 132, which includes, without limitation, an event public key 312, a power controller 372, a power circuit 374, transceivers 376, and an oscillator 378.

In operation, the event manager 122 receives the indicator message 106 or indicators messages 106 sent by the event generator 104 from within the secure environment 110. The event processing unit 310 authenticates the signed event indicator 116 included in the indicator message 106, such as by using the event public key 312. When the event processing unit 310 successfully authenticates the signed event indicator 116, the event processing unit 310 processes the DRC event parameters included in the signed event indicator 116 to manage the DRC event. In various embodiments, the event processing unit 310 can modify the DRC event parameters based on the data and/or metadata received from the external data sources 302. The event processing unit 310 transmits the DRC event to the device manager 320. The device manager 320 generates a set of commands 126 based on one or more of the DRC event parameters included in the DRC event and generates, for a given endpoint device 132, a command message 124 containing the signed authorization permit 114 and/or the command 126 and then transmits the command message 124 to the given endpoint device 132.

The endpoint device 132 receives the command message 124 and authenticates the signed authorization permit 114. For example, the endpoint device 132 can use the event public key 312 to authenticate the signature for the signed authorization permit 114. Upon successfully authenticating the signed authorization permit 114, the endpoint device 132 can use the authenticated authorization permit 114 to validate the command 126 and perform the commanded action. For example, the endpoint device 132 use information included in the signed authorization permit 114 (e.g., event start time, event duration, target ID, signer ID etc.) to determine whether the command 126 has the correct permissions. Upon validating the command 126, the power controller 372 associated with the endpoint device 132 can identify the power control operation specified in the command 126 and can then perform the power control operation by modifying the operation of the power circuit 374.

The environment 120 is an environment that is distinct from the secure environment 110. In various embodiments, the environment 120 can be a separate secure environment that implements a separate set of security protocols than the security protocols associated with the secure environment 110. Additionally or alternatively, the event generator 104 can transmit the indicator message 106 to the event manager 122 via a secure communication channel (not shown).

The external data sources 302 include one or more data sources that provide data and metadata associated with the bulk electrical grid. For example, the external data sources 302 can include a customer database that includes customer data, data sources that provide telemetry data, data sources that provide forecast data, and so forth. In some embodiments, one or more external data sources 302 can be included in the environment 120. In various embodiments, the external data sources 302 can include, without limitation, a database of validated device metadata, a reporting service (e.g., SQL server reporting services), simulation services, and so forth. In some embodiments, the event processing unit 310 can receive data and/or metadata from the external data source 302 and use such data and/or metadata when distributing the DRC event. For example, the event processing unit 310 can add or remove specific endpoint devices 132 from the DRC event based on customer data (e.g., opting out of the DRC event) and/or updated simulation data.

The event manager 122 manages one or more distributed energy resources, such as the endpoint devices 132, that consume power generated by the bulk electrical grid. In various embodiments, the event manager 122 can be an application operating on one or more devices within the environment 120 that communicate with other devices to control the execution of a DRC event. For example, the event manager 122 can transmit various messages including commands to the endpoint devices 132 in order to cause the endpoint devices 132 receiving the message to modify power consumption. Additionally or alternatively, in some embodiments, the event manager 122 can provide notifications to customers (e.g., owners and/or operators of one or more endpoint devices 132) about a DRC event. For example, the event manager 122 can generate and transmit notifications (e.g., email, SMS, voice, etc.) to customers that alert the customers about an upcoming DRC event and how the DRC event will affect their endpoint devices 132. In such instances, the event manager 122 can identify specific endpoint devices 132 to control when executing the DRC event.

The event manager 122 includes computing device hardware configured to perform processing operations and execute program code. As shown, the event manager 122 includes one or more processors 350, one or more input/output (I/O) devices 360, and memory 330, coupled together. The processor 350 can include any hardware configured to process data and execute software applications. In general, the processor 350 retrieves and executes programming instructions stored in the memory 330. The one or more I/O devices 360 include devices configured to receive input, devices configured to provide output, and devices configured to both receive input and provide output.

The event processing unit 310 receives the indicator message 106 from the event generator 104 and processes the DRC event specified by the signed event indicator 116. In various embodiments, a public key infrastructure (PKI) can distribute the event public key 312 to devices participating in the DRC event. For example, the event generator 104 can cause a PKI to export copies of the event public key 312 to the event manager 122 and/or the endpoint devices 132. In various embodiments, the event processing unit 310 can authenticate the signed event indicator 116 using the event public key 312 (e.g., the event public key 312(1)) that corresponds to the event private key 234 that the event generator 104 used when signing the signed event indicator 116. When the event processing unit 310 successfully authenticates the signed event indicator 116, the event processing unit 310 determines that the event generator 104 validly signed the DRC event indicator within the secure environment 110. In such instances, the event processing unit 310 can then implement the DRC event described by the signed event indicator 116. When the event processing unit 310 does not successfully authenticate the signed event indicator 116, the event processing unit 310 can cease any further processing or distribution of the DRC event.

In some embodiments, the event processing unit 310 can split the DRC event into multiple portions. For example, in some embodiment, the event processing unit 310 can generate multiple event indicators that separate portions of the DRC event by geographic region. In some embodiments, the event processing unit 310 can split the event by device type corresponding to the device types of the endpoint devices 132. Additionally or alternatively, the event processing unit 310 can modify the contents of the DRC event. For example, the event processing unit 310 can add MAC addresses for each endpoint device 132 involved in the DRC event.

The device manager 320 controls the set of endpoint devices 132 involved in the DRC event by generating and transmitting the command messages 124 to the respective endpoint devices 132. In various embodiments, the device manager 320 can receive the DRC event as generated or modified by the event processing unit 310 and can generate separate command messages 124 (e.g., 124(1), 124(2), etc.) for each of the respective endpoint devices 132 that are involved in the DRC event. In various embodiments, the device manager 320 can identify power control actions that a given endpoint device 132 is to take as part of the DRC event. In such instances, the device manager 320 can generate a command 126 that corresponds to the power control action specified in the DRC event. Alternatively, in some embodiments, the DRC event may not include power control actions for a specific endpoint device 132. For example, the DRC event could specify that a group of five endpoint devices are to reduce power demand by 5000 kW for a 30-minute period. The device manager 320 can perform various load balancing techniques to generate a set of 5 commands 126(1)-126(5) that combine to fulfill the specifications made by the DRC event.

In various embodiments, the device manager 320 can generate several types of command messages 124 based on the type of endpoint device 132 receiving the message. For example, the device manager 320 can generate a command message 124(1) of a first type that is handled by a home area network (HAN) communications manager that interacts with specific types of endpoint devices 132 (e.g., GenX devices produced by Sierra Wireless) and generate a command message 124(2) of a second type that is handled by a separate Horizon device manager for devices produced by Horizon Power Systems.

The endpoint device 132 is representative of one or more devices within the field area network 130 that can control the consumption of power generated within the bulk electrical grid. In various embodiments, the endpoint device 132 can include a power circuit 374 that receives power from one or more sources and enables various functionalities using the received power. In some embodiments, the endpoint device 132 can include a power controller 372 that controls power provided to the power circuit 374. Alternatively, in some embodiments, either the power controller 372 and/or the power circuit 374 can be separate from the endpoint device 132. For example, the power controller 372 could be separate from the endpoint device 132 and receive power control commands from the endpoint device 132. As another example, the power controller 372 can control an external power circuit 374 that provides power delivery to one or more devices separate from the endpoint device 132, such as an HVAC system, a pool pump, and/or the like.

In various embodiments, the endpoint device 132 could be, without limitation, a smart thermostat, a lighting device (e.g., commercial lighting), household appliances, house batteries, mains-powered device (MPD) nodes, battery-powered device (BPD) nodes, and so forth. In various embodiments, the endpoint device 132 can authenticate the signed authorization permit 114 and can validate the command 126 using the authenticated authorization permit 114. For example, the endpoint device 132 can use the event public key 312 to authenticate the signature of signed authorization permit 114 included in the command message 124. In such instances, when the endpoint device 132 successfully authenticates the command message, the endpoint device 132 can perform the commanded action.

The transceivers 376 are configured to transmit and receive data packets across a network system using a range of channels and power levels. Each transceiver 376 includes one or more radios implemented in hardware and/or software to provide RF communications with other devices in the FAN 130 via one or more communication links. The transceiver 376 can also, or instead, include a cellular modem that is used to transmit data to and receive data from a cellular base station via a corresponding link. The oscillator 378 provides one or more oscillation signals according to which the transmission and reception of data packets can be scheduled. The endpoint device 132 can further include various analog-to-digital and digital-to-analog converters, digital signal processors (DSPs), harmonic oscillators, transceivers, and any other components generally associated with RF-based communication hardware.

The power controller 372 includes hardware and/or software that controls the power consumption of the endpoint device 132. In various embodiments, the power controller 372 can execute the command 126 by performing a power control action to control the power circuit 374. In some embodiments, the power controller 372 can operate one or more switches that connect the power circuit 374 to a power supply. Additionally or alternatively, in some embodiments, the power controller 372 can control the operation of power circuit 374 to consume less power (e.g., switch the power source to a local power source, dim lighting, change a duty cycle, etc.). In some embodiments, the power controller 372 can be a switch separate from the endpoint device 132; in such instances, the power controller 372 can control the quantity of power the endpoint device 132 consumes without directly controlling components of the power circuit 374.

The power circuit 374 is one or more circuits that carries electricity to operate an electrical load. In various embodiments, the power circuit 374 directs electricity to various components of the endpoint device 132 to enable functionality of the endpoint device 132. For example, when the endpoint device 132 is a heating system, the power circuit 374 carries electricity to operating the heating elements. In various embodiments, the power circuit 374 can control the power consumption of the electrical load, thereby changing the amount of power that the endpoint device 132 consumes. For example, when the power circuit 374 changes duty cycles of a harmonic circuit, the power circuit 374 can raise or lower the amount of power that the endpoint device 132 consumes.

Physically Secured Authorization

Figure 4:
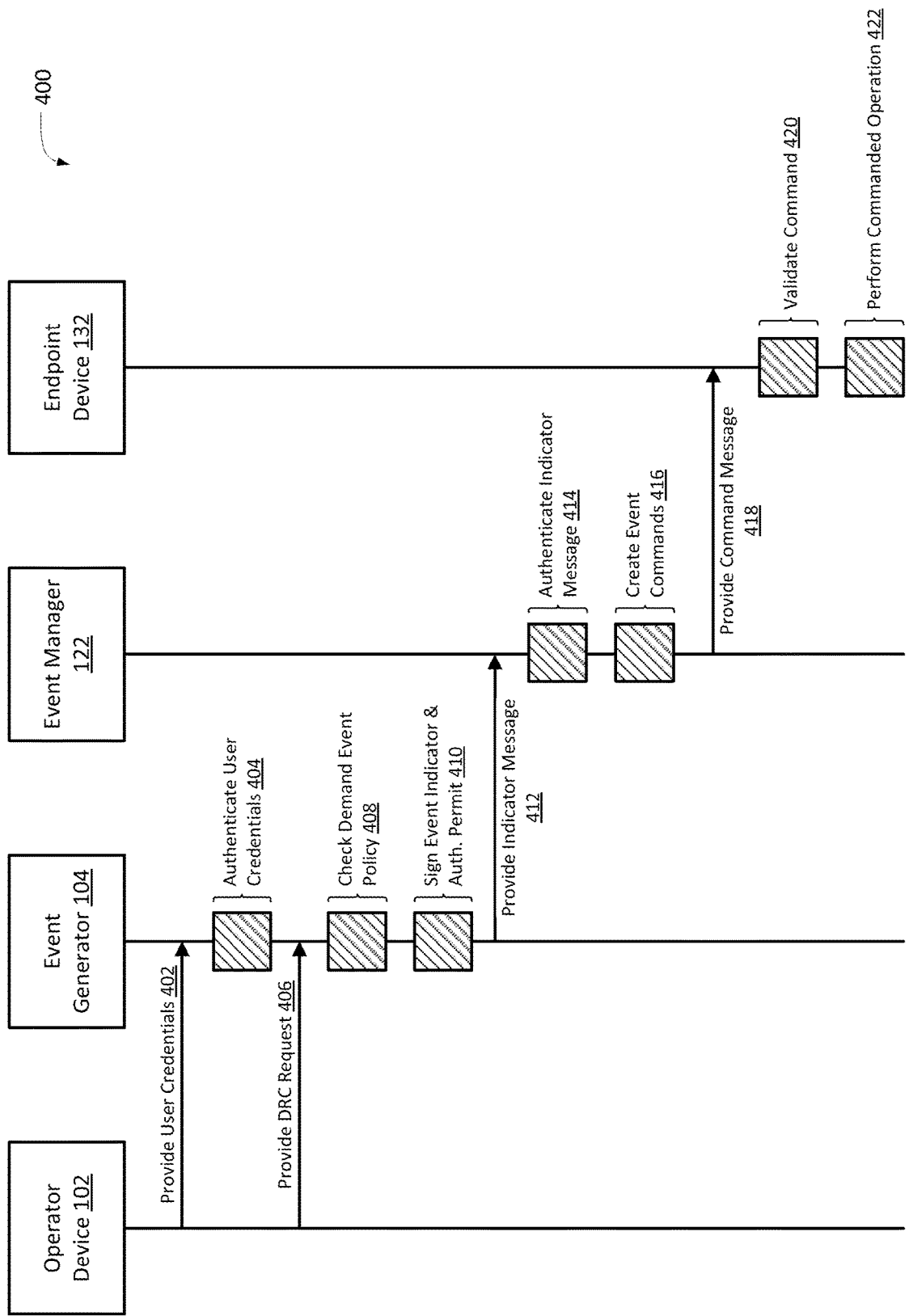
FIG. 4 illustrates an interaction diagram between various components of the secure demand response management system of FIG. 1, according to various embodiments.

FIG. 4 illustrates an interaction diagram 400 between various components of the secure demand response management system 100 of FIG. 1, according to various embodiments. Although the interactions between devices are shown in an order, persons skilled in the art will understand that the interactions may be performed in a different order, interactions may be repeated or skipped, and/or may be performed by components other than those described in FIG. 4.

As shown in FIG. 4, the operator device 102 provides 402 the user credentials 402 to the event generator 104. In various embodiments, a human operator can submit various user credentials 402, such as a signature, password, digital signature, biometric data, a physical key, a digital key, a keycard, etc., to establish her identity as a user authorized to access the event generator 104.

The event generator 104 within the secure environment 110 receives the user credentials 204 and performs actions 404 to authenticate the human operator by processing the user credentials 204. In various embodiments, a hardware security module, such as the security engine 218, can compare the user credentials with credentials of authenticated users. For example, the security engine 218 can receive the user credentials 204 that include biometric data and can compare the received biometric data with the biometric data of authorized users (stored in the user DB 232).

The operator device 102 provides 406 the demand response control event request 112 to the event generator 104. In various embodiments, upon successful user authentication, a human operator can access the user interface 212 of the event control unit 210 operating on the event generator 104. In some embodiments, the operator device 102 can provide a browser that enables the operator device 102 to run portions of the event generator 104 as a web service; in such instances, the operator device 102 can display one or more portions of the user interface 212 provided by the event generator 104 via the browser. In various embodiments, when generating the DRC event request 112, the human operator via the operator device 102 can specify one or more DRC event parameters that specify the characteristics of the DRC event that is to occur.

The event generator 104 receives the DRC event request 112 and performs actions 408 to check whether the DRC event request 112 adheres to an event policy. In various embodiments, the event rules engine 216 included in the event generator 104 can compare the DRC event request 112 with the one or more DRC event policies included in the DRC event policy DB 236 to determine whether to approve the DRC event request 112 and generate a DRC event policy. Performing the comparison includes determining whether each of the DRC parameters included in the DRC event request 112 adheres the rules of a given DRC event policy. When the event rules engine 216 determines that the DRC event request 112 does not adhere to one or more rules of the DRC event policy, the event generator 104 rejects the DRC event request 112 and refrains from generating a DRC event.

When the event generator 104 determines that the DRC event request 112 adheres to the DRC event policy, the event generator 104 performs actions 410 to generate a DRC event. In various embodiments, the event control unit 210 generates the DRC event upon determining that the DRC event request 112 adheres to the one or more DRC event policies and is valid. In some embodiments, the event control unit 210 generates the DRC event by generating (i) an event indicator describing the DRC event parameters and (ii) one or more authorization permits indicating that one or more endpoints are approved to perform a given power control operation. The security engine 218 signs each of the event indicator and the authorization permit(s) with the one or more event private keys 234. Signing the event indicator generates the signed event indicator 116 and signing the authorization permit generates the one or more signed authorization permits 114. In such instances, devices authenticate data signed by the event generator 104, such as by using event public keys 312 paired to the one or more event private keys 234.

Upon generating the DRC event, the event generator 104 provides 412 an indicator message to the event manager 122 included in the environment 120, where the transmission 412 includes the indicator message 106. In various embodiments, the event control unit 210 creates an indicator message 106 that includes the signed event indicator 116 and the one or more signed authorization permits 114. The event manager 122, upon receiving the indicator message 106, performs actions 414 to authenticate the indicator message 106 and determine the DRC event parameters from the signed event indicator 116. In various embodiments, the event processing unit 310 included in the event manager 122 can authenticate the signed event indicator 116 using the event public key 312 that corresponds to the event private key 234 that the event generator 104 used when signing the signed event indicator 116.

Upon authenticating the DRC event, the event manager 122 performs actions 416 to generate event commands 126 for each of the respective endpoint devices 132 involved in the DRC event. In various embodiments, the device manager 320 can receive the DRC event as generated or modified by the event processing unit 310 and can generate separate command messages 124 (e.g., 124(1), 124(2), etc.) for each of the respective endpoint devices 132 that are involved in the DRC event. In various embodiments, the device manager 320 can identify specific power control actions that a given endpoint device 132 is to take as part of the DRC event. In such instances, the device manager 320 can generate a command 126 that corresponds to the power control action specified in the DRC event.

The event manager 122 provides 418 the command message 124 for the specific endpoint device 132. In various embodiments, the device manager 320 included in the event manager 122 can generate a command message 124 includes the command 126 along with the signed authorization permit 114. In some embodiments, the device manager 320 can transmit separate command messages 124 to each endpoint device 132. For example, the device manager 320 can transmit the signed authorization permit 114 in a preparator command message. The device manager 320 can then send the command 126 in an execution command message.

The endpoint device 132 performs actions 420 to validate the command 126. In various embodiments, the endpoint device 132 can authenticate the signed authorization permit 114 and use the contents of the authenticated authorization permit to validate the command 126. For example, the endpoint device 132 can use the event public key 312 paired to the event private key 234 to authenticate the signature of the signed authorization token 114. Upon successfully authenticating the signed authorization permit 114, the endpoint device 132 use information included in the signed authorization permit 114 to determine whether the event generator 104 authorized the endpoint device 132 to perform the command 126.

The endpoint device 132 performs actions 422 to execute the commanded action. For example, upon the endpoint device 132 validating the command 126, the power controller 372 associated with the endpoint device 132 can identify the power control operation specified in the command 126 and can then perform the power control operation by modifying the operation of the power circuit 374.

Figure 5:
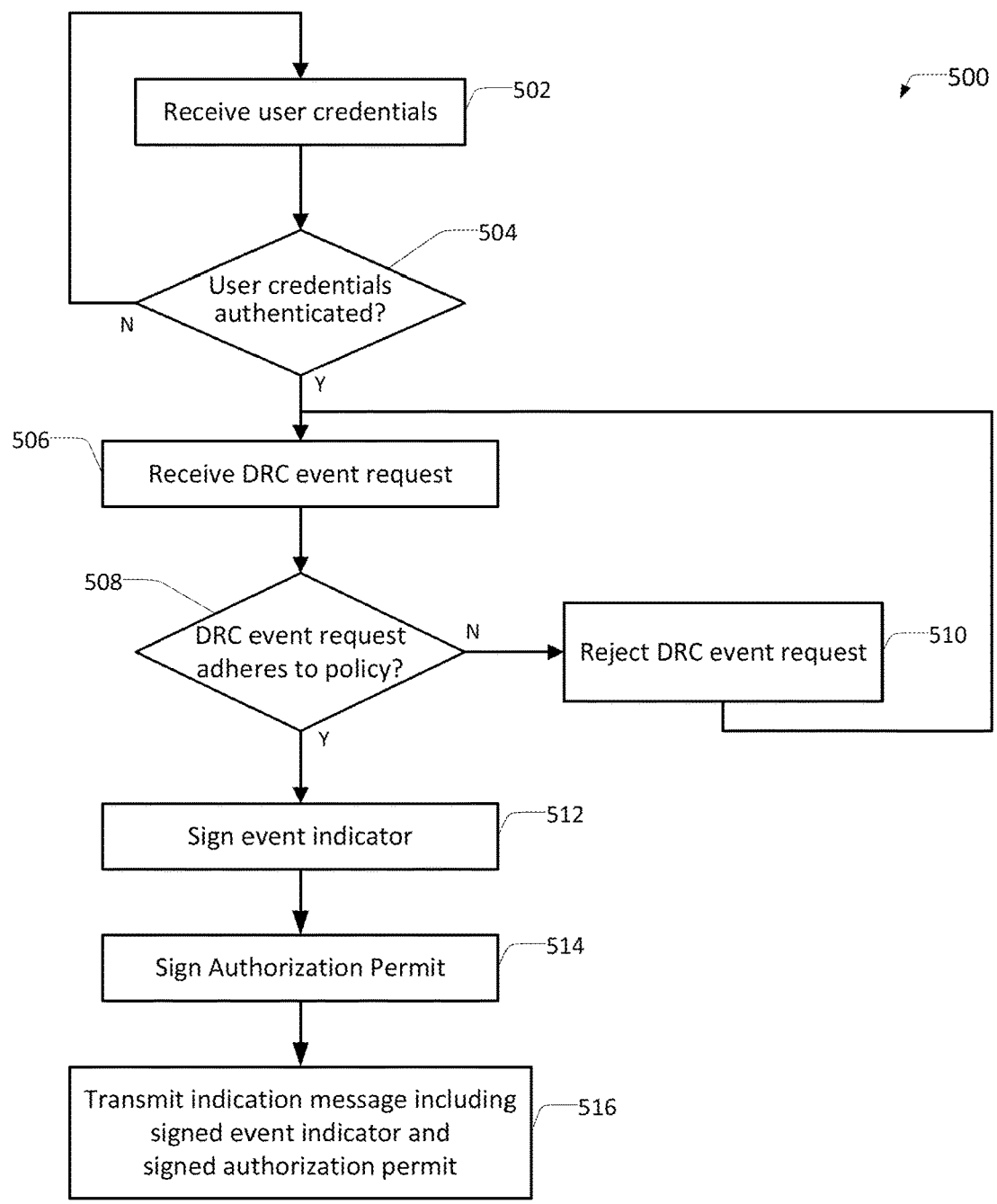
FIG. 5 sets forth a flow chart of method steps for processing a demand response control event request, according to various embodiments.

FIG. 5 sets forth a flow chart of method steps for processing a demand response control event request, according to various embodiments. Although the method steps are described with reference to the systems of FIGS. 1-4 and 8, persons skilled in the art will understand that any system configured to implement the method steps, in any order, falls within the scope of the present invention.

As shown in FIG. 5, the method 500 begins at step 502, where an event generator 104 within the secure environment receives a set of user credentials 204. In various embodiments, the event generator 104 receives the user credentials 204 and authenticates the human operator by processing the user credentials 204. In some embodiments the security engine 218 included in the event generator 104 can compare the user credentials 204 with credentials of authenticated users. For example, the security engine 218 can receive the user credentials 204 that include biometric data and can compare the received biometric data with the biometric data of authorized users (stored in the user DB 232).

At step 504, the event generator 104 determines whether the user credentials 204 were successfully authenticated. When the security engine 218 successfully authenticates the user credentials 204, the event generator 104 proceeds to step 506; otherwise, the security engine 218 does not successfully authenticate the user credentials 204 and returns to step 502 to wait and received additional user credentials 204.

At step 506, the event generator 104 receives the DRC event request 112. In various embodiments, an authenticated operator generates the DRC event request 112 and the operator device 102 transmits the DRC event request 112 to the event generator 104. For example, an authenticated human operator can access the event processing unit 310 operating on the event generator 104. The human operator via the operator device 102 can specify one or more DRC event parameters that specify the characteristics of the DRC event that is to occur.

At step 508, the event generator 104 determines whether the DRC event request 112 adheres to a DRC event policy. In various embodiments, the event rules engine 216 included in the event generator 104 can compare the DRC event request 112 with the one or more DRC event policies included in the DRC event policy DB 236 to determine whether to approve the DRC event request 112 and generate a DRC event policy. Performing the comparison includes determining whether each of the DRC parameters included in the DRC event request 112 adheres to each rule of a given DRC event policy.

When the event generator 104 determines that the DRC event request 112 adheres to the DRC event policy, the event generator 104 proceeds to step 512. Otherwise, when the event rules engine 216 determines that the DRC event request 112 does not adhere to the DRC event policy, the event generator 104 proceeds to step 510, where the event generator 104 rejects the DRC event request 112 and refrains from generating a DRC event. Upon rejecting the DRC event request 112, the event generator 104 returns to step 506 to receive a different DRC event request 112.

At step 512, the event generator 104 signs an event indicator. In various embodiments, the event control unit 210 generates a DRC event upon determining that the DRC event request 112 adheres to the one or more DRC event policies and is valid. In such instances, the event control unit 210 can generate an event indicator describing the DRC event parameters. In some embodiments, the security engine 218 can use the event private key 234 to sign the event indicator, generating the signed event indicator 116.

At step 514, the event generator 104 generates the signed authorization permit 114. In various embodiments, the event control unit 210 can generate an authorization permit indicating that the event generator 104 approved the one or more endpoint devices 132 to perform power control operations associated with the DRC event. In such instances, the event generator 104 can use the same event private key 234 or a different private event key 234 to generate the signed authorization permit 114.

At step 516, the event generator transmits an indicator message 106 that includes the signed event indicator 116 and the signed authorization permit 114. In various embodiments, the event control unit 210 can transmit the indicator message 106 to the event manager 122 included in the environment 120. In such instances, one or more downstream devices can use an event public key 312 corresponding to the event private key 234 to authenticate the signed event indicator 116 and/or the signed authorization permit 114.

Figure 6:
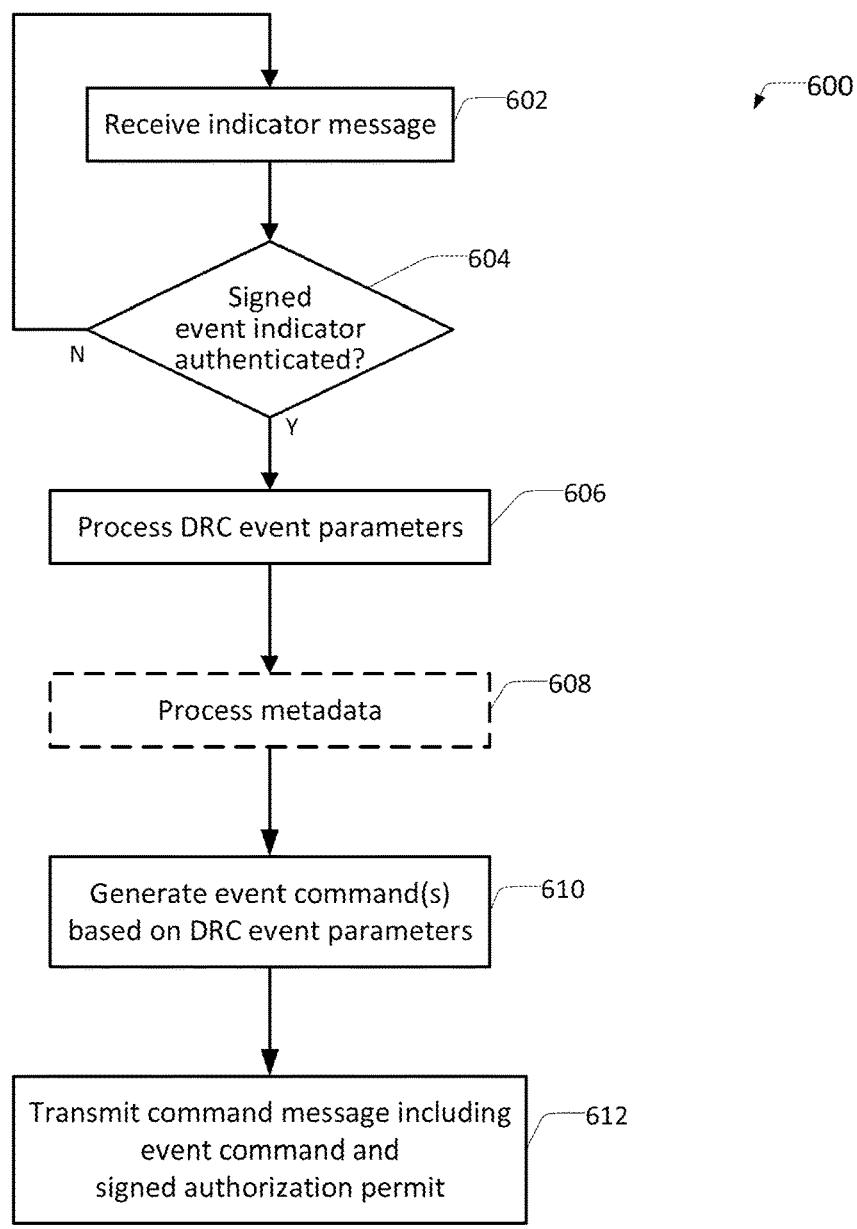
FIG. 6 sets forth a flow chart of method steps for generating command messages based on an indicator message, according to various embodiments.

FIG. 6 sets forth a flow chart of method steps for generating command messages based on an indicator message, according to various embodiments. Although the method steps are described with reference to the systems of FIGS. 1-4 and 8, persons skilled in the art will understand that any system configured to implement the method steps, in any order, falls within the scope of the present invention.

As shown, the method 600 begins a step 602, where the event manager 122 receives an indicator message 106. In various embodiments, the event manager 122 in environment 120 can receive the indicator message 106 from the event generator 104 included in the secure environment 110. At step 604, the event manager 122 determines whether the signed event indicator is authenticated. In various embodiments, the event processing unit 310 included in the event manager 122 can authenticate the signature of the signed event indicator 116. For example, the event manager could use the event public key 312 to authenticate the signed event indicator 116. When the event processing unit 310 successfully authenticates the signed event indicator 116, the event manager 122 proceeds to step 606; otherwise, the event manager 122 rejects the indicator message and returns to step 602 to wait for a subsequent indicator message 106.

At step 606, the event manager 122 processes the DRC event parameters. In various embodiments, the event manager 122 can determine the DRC event parameters specified in the signed event indicator 116. For example, the event manager 122 can identify the MAC address of each endpoint device 132 involved in the DRC event. Additionally or alternatively, the event manager 122 can determine specific power control actions in order to reach the DRC event parameters. For example, the event manager 122 can perform various load balancing techniques to specify how individual endpoint devices 132 in a subset of the endpoint devices 132 can perform actions to collectively lower power demand by 5000 kW for 15 minutes.

At step 608, the event manager 122 can optionally process metadata and/or other data. In various embodiments, the event processing unit 310 can receive metadata and/or other data from one or more external data sources 302. For example, the event manager 122 can use device data to identify device-specific information (e.g., data format, network addressing, geographic region, etc.), forecasting data, telemetry data, etc. In such instances, the event processing unit 310 can process the additional data to modify one or more DRC event parameters included in the DRC event.

At step 610, the event manager 122 generates one or more event commands 126 based on the one or more DRC event parameters. In various embodiments, the device manager 320 included in the event manager 122 can generate event commands 126 for each of the respective endpoint devices 132 involved in the DRC event. In various embodiments, the device manager 320 can receive the DRC event parameters as generated or modified by the event processing unit 310 and can generate separate command messages 124 (e.g., 124(1), 124(2), etc.) for each of the respective endpoint devices 132 that are involved in the DRC event.

At step 612, the event manager transmits the one or more command messages 124 that include the signed authorization permit 114 and the event command 126. In various embodiments, the device manager 320 can generate a command message 124 that includes the command 126, along with the signed authorization permit 114. In some embodiments, the device manager 320 can transmit separate command messages 124 to each endpoint device 132. For example, the device manager 320 can transmit the signed authorization permit 114 in a preparator command message. The device manager 320 can then send the command 126 in an execution command message.

Figure 7:
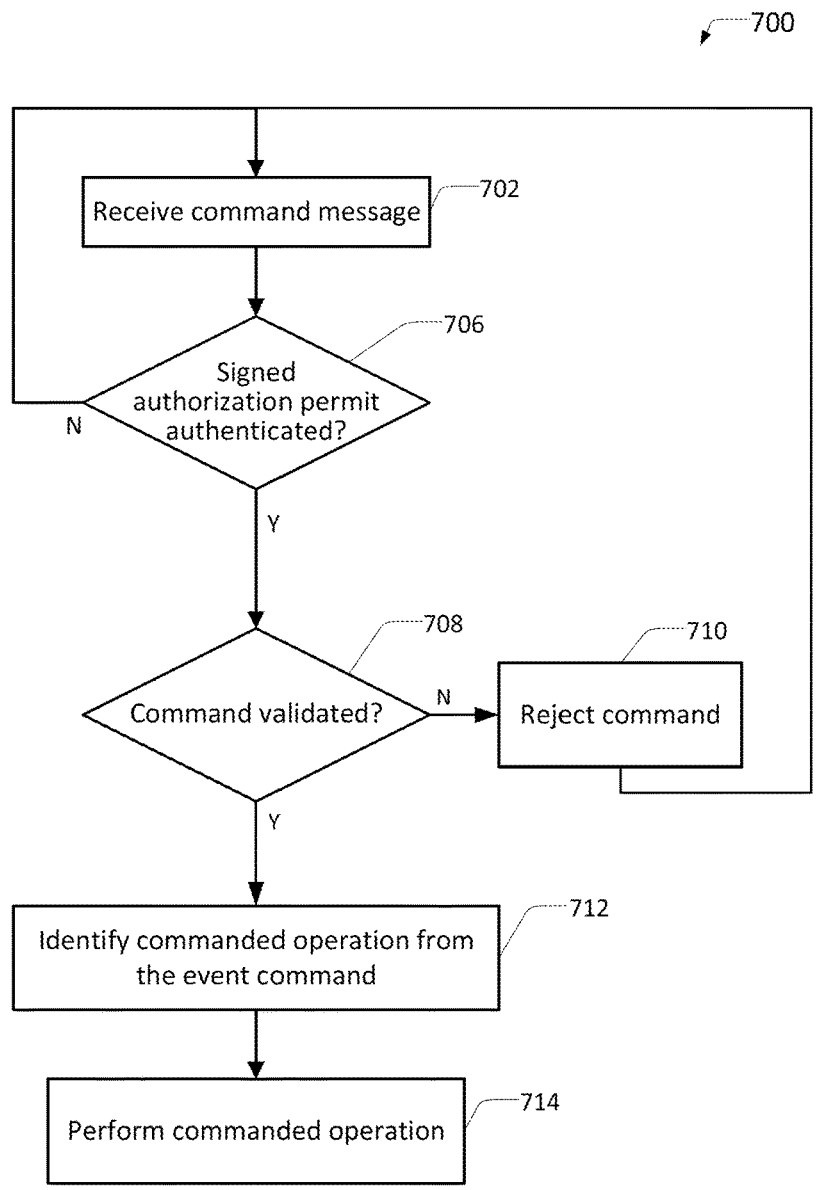
FIG. 7 sets forth a flow chart of method steps for responding to an event command, according to various embodiments.

FIG. 7 sets forth a flow chart of method steps for responding to an event command, according to various embodiments. Although the method steps are described with reference to the systems of FIGS. 1-4 and 8, persons skilled in the art will understand that any system configured to implement the method steps, in any order, falls within the scope of the present invention.

As shown, the method 700 begins at step 702, where the endpoint device 132 receives a command message 126 from the event manager 122. In various embodiments, one or more endpoint devices 132 in a field area network 130 can receive distinct command messages 124 from the event manager 122 in the environment 120, where the command message includes a signed authorization permit 114 and/or a command 126 is included in the DRC event.

At step 706, the endpoint device 132 determines whether the signed authorization permit 114 included in the command message 124 is authenticated. In various embodiments, the endpoint device 132 and/or the power controller 372 can authenticate the signature of the authorization permit 114. For example, the endpoint device 132 could use the event public key 312 to authenticate the signature of the signed authorization permit 114 that the event generator 104 created with the event private key 234. When the endpoint device 132 successfully authenticates the signed authorization permit 114, the endpoint device 132 proceeds to step 708; otherwise, the endpoint device 132 does not authenticate the signed authorization permit 114 and rejects the command message 124 by returning to step 702 to wait for a different command message 124.

At 708, the endpoint device 132 determines whether command 126 is validated. In various embodiments, the endpoint device 132 can use information included in the signed authorization permit 114 (e.g., event start time, event duration, target ID, signer ID, etc.) to determine whether the command 126 has the correct permissions. When the endpoint device 132 determines that the command 126 is validated, the endpoint device 132 proceeds to step 710. Otherwise, the endpoint device 132 determines that the command 126 is not validated and proceeds to step 710 to reject the command 126. Upon rejecting the command, the endpoint device 132 returns to step 702 to receive a subsequent command message 126.

At step 712, the endpoint device 132 identifies the commanded operation from the event command 126. In various embodiments, the power controller 372 can identify one or more power control actions that are specified in the command 126. At step 714, the endpoint device 132 performs the power control action. In various embodiments, the power controller 372 can perform the power control action to modify the power demand of the endpoint device. For example, the power controller 372 can modify the operation of the power circuit 374 by reducing power consumption of the electrical load coupled to the power circuit 374. In another example, the power controller 372 can modify a state of a switch such that the power circuit 374 does not receive any electricity.

Field Area Networks

Figure 8:
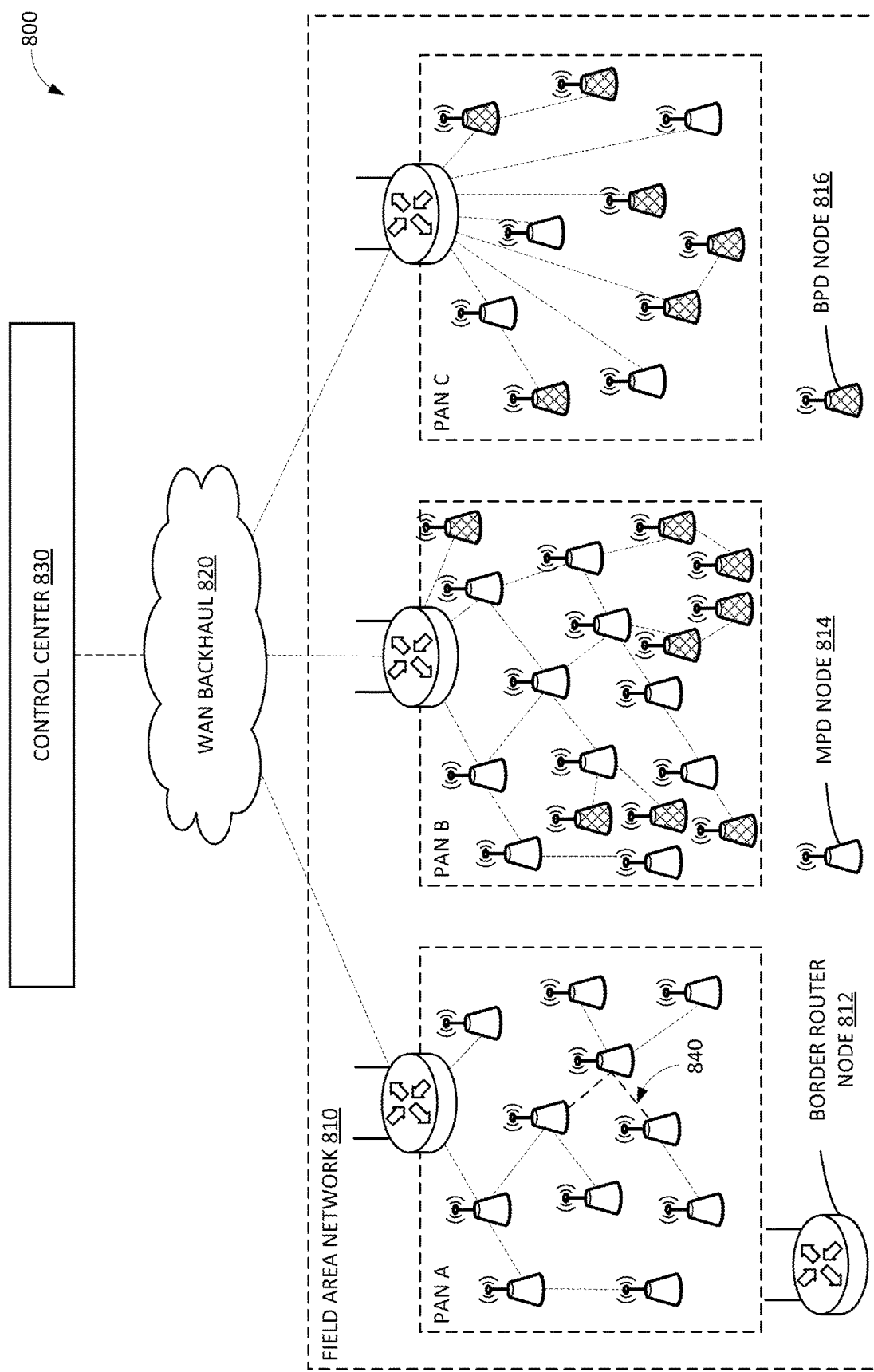
FIG. 8 illustrates a network system configured to implement one or more aspects of the various embodiments.

FIG. 8 illustrates a network system 800 configured to implement one or more aspects of the present embodiments. As shown, the network system 800 includes a field area network (FAN) 810, a wide area network (WAN) backhaul 820, and a control center 830. The FAN 810 is coupled to the control center 830 via the WAN backhaul 820. The control center 830 is configured to coordinate the operation of FAN 810.

The FAN 810 includes personal area network (PANs) A, B, and C. The PANs A and B are organized according to a mesh network topology, while the PAN C is organized according to a star network topology. Each of the PANs A, B, and C includes at least one border router node 812 and one or more mains-powered device (MPD) nodes 814. The PANs B and C further include one or more battery-powered device (BPD) nodes 816. Any of the border router node 812, the one or more MPD nodes 814, or the BPD nodes 816 can be used to implement the techniques discussed above with respect to FIGS. 1-7.

The MPD nodes 814 draw power from an external power source, such as mains electricity or a power grid. The MPD nodes 814 typically operate on a continuous basis without powering down for extended periods of time. The BPD nodes 816 draw power from an internal power source, such as a battery. The BPD nodes 816 typically operate intermittently and power down, go to very low power mode, for extended periods of time in order to conserve battery power.

The MPD nodes 814 and the BPD nodes 816 are coupled to, or included within, a utility distribution infrastructure (not shown) that distributes a resource to consumers. The MPD nodes 814 and the BPD nodes 816 gather sensor data related to the distribution of the resource, process the sensor data, and communicate processing results and other information to control center 830. The border router nodes 812 operate as access points to provide the MPD nodes 814 and the BPD nodes 816 with access to the control center 830.

Any of the border router nodes 812, the MPD nodes 814, and the BPD nodes 816 are configured to communicate directly with one or more adjacent nodes via bi-directional communication links, such as the bi-directional communication link 840. The communication links can be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" can correspond to a particular range of frequencies. In one embodiment, a node can compute a current receive channel by evaluating a Jenkins hash function based on a total number of channels and the media access control (MAC) address of the node.

Each node within a given PAN can implement a discovery protocol to identify one or more adjacent nodes or "neighbors." A node that has identified an adjacent, neighboring node can establish a bi-directional communication link with the neighboring node. Each neighboring node can update a respective neighbor table to include information concerning the other node, including the MAC address of the other node as well as a received signal strength indication (RSSI) of the communication link established with that node.

Nodes can compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node.

Any of the nodes discussed above can operate as a source node, an intermediate node, or a destination node for the transmission of data packets. A given source node can generate a data packet and then transmit the data packet to a destination node via any number of intermediate nodes (in mesh network topologies). The data packet can indicate a destination for the packet and/or a particular sequence of intermediate nodes to traverse in order to reach the destination node. In one embodiment, each intermediate node can include a forwarding database indicating various network routes and cost metrics associated with each route.

Nodes can transmit data packets across a given PAN and across the WAN backhaul 820 to control center 830. Similarly, the control center 830 can transmit data packets across the WAN backhaul 820 and across any given PAN to a particular node included therein. As a general matter, numerous routes can exist which traverse any of the PANs A, B, and C and include any number of intermediate nodes, thereby allowing any given node or other component within network system 800 to communicate with any other node or component included therein.

The control center 830 includes one or more server machines (not shown) configured to operate as sources for, or destinations of, data packets that traverse within the network system 800. The server machines can query nodes within the network system 800 to obtain various data, including raw or processed sensor data, power consumption data, node/network throughput data, status information, and so forth. The server machines can also transmit commands and/or program instructions to any node within the network system 800 to cause those nodes to perform various operations. In one embodiment, each server machine is a computing device configured to execute, via a processor, a software application stored in a memory to perform various network management operations.

In sum, a secure DRMS that includes an event generator in a secure environment transmits secure messages attesting to the authenticity of DRC events generated within the secure environment. Downstream devices outside the secure environment can authenticate the secure message to determine whether a DRC event was generated within the secure environment and authorized the downstream devices to perform actions specified in the DRC event. For example, the DRMS authenticates a human operator managing a DRC event. When an authenticated human operator generates a DRC event request, the event generator checks the DRC event request with an DRC event policy. When the event generator determines that the DRC event request adheres to the DRC event policy, the event generator creates a DRC event that includes an event indication of parameters specified in the DRC event request. The event generator also creates one or more authorization permits indicating specific devices that are authorized to participate in the DRC event. The event generator signs the event indication and the one or more authorization permits.

The event manager generates an indicator message including the one or more signed authorization permits and the signed event indication. The event manager transmits the indicator message outside the secure environment, where an event manager authenticates the indication message. The event manager generates distinct commands for the respective endpoint devices involved in the DRC event. The event manager also generates distinct command messages for each of the distinct commands. In some embodiments, the command messages further include a signed authorization permit that authorizes the respective endpoint devices to participate in the DRC event. Alternatively, the event manager can transmit the signed authorization permits in separate messages to the respective endpoint devices. Each of the respective endpoint devices receives a command message and authenticates the signed authorization permit. The respective endpoints information included in the signed authorization permits to validate the command before performing the operation specified in the command.

At least on technical advantage of the disclosed techniques relative to the prior art is that, with the disclosed techniques, a secure DRMS can indicate to devices outside of the secure environment that a given DRC event is generated by an authenticated operator and adhere to a DRC event policy. In particular, because the secure DRMS can send secure messages to devices outside of the secure environment while ensuring the authenticity of a given DRC event, fewer devices need to be within the secure environment while maintaining security protocols associated with demand events. Reducing the number of devices that are required to be included in the secure environment reduces the cost and complexity associated with maintaining a secure environment among distributed devices. Further, the secure DRMS can control a large quantity of endpoint devices while complying with various security protocols, such as the NERC-CIP rules. These technical advantages provide one or more technological improvements over prior art approaches.

1. In various embodiments, a method comprises validating, by a first computing system in a secured computing environment, a demand event generated by an operator, where the operator is authenticated to generate demand events within the secured computing environment, and the demand event corresponds to a set of endpoints operating outside the secured computing environment, generating, by the first computing system, an authorization permit associated with the demand event, and sending, from the first computing system to a second computing system outside of the secured computing environment, (i) an indicator of the demand event, and (ii) the authorization permit, where the demand event is usable by the second computing system to generate a demand event command for the set of endpoints, and the authorization permit is usable by the set of endpoints to validate the demand event command.
2. The method of clause 1, where the second computing system is in a second computing environment distinct from the secured computing environment, the secured computing environment satisfies a first security policy, and the second computing environment satisfies a second security policy different from the first security policy.
3. The method of clause 1 or 2, where the first security policy includes a first set of electronic security requirements for the secured environment, and a first set of physical security requirements for one or more devices included in the secured environment.
4. The method of any of clauses 1-3, where the operator is authenticated using a set of biometric data provided by the operator.
5. The method of any of clauses 1-4, where a subset of the set of endpoints are respectively coupled to a set of power-consuming devices, and the subset of the set of endpoints are operable to reduce electrical power consumed by the set of power-consuming devices during the demand event.
6. The method of any of clauses 1-5, where validating the demand event generated by the operator comprises receiving a request to generate the demand event, comparing the request to at least a first demand event policy, determining that the request adheres to the first demand event policy, and generating the demand event based on the request.
7. The method of any of clauses 1-6, where the first demand event policy specifies a maximum threshold for a reduction of power demand within a specified period.
8. The method of any of clauses 1-7, further comprising before transmitting the indicator of the demand event, signing, by the first computing system using a first private key, the indicator of the demand event, and before transmitting the authorization permit, signing, by the first computing system using the first private key or a second private key, the authorization permit.
9. The method of any of clauses 1-8, where a first public key corresponding to the first private key is usable by at least one of the second computing system or the set of endpoints to authenticate at least one of the signed indicator or the signed authorization permit.
10. The method of any of clauses 1-9, where the authorization permit includes at least one of an identifier of an endpoint device in the set of endpoint devices, a start time for the demand event, a duration of the demand event, or an identifier of the first computing system.
11. In various embodiments, one or more non-transitory computer-readable media storing instruction that, when executed by one or more processors, cause the one or more processors to perform the steps of authenticating, by a first server within a secured network, an operator, where an authenticated operator is authorized to generate one or more demand response control events within the secured network, validating, by the first server, a demand response control event request generated by an operator, wherein the demand response control event request specifies one or more power load modifications by a set of endpoints operating outside the secured network, signing, by the first server, an authorization permit associated with a demand response control event corresponding to the demand response control event request, wherein signing the authorization permit generates a secure token, and sending, from the first server to a device outside of the secured network, a message including (i) an indicator of the demand response control event, and (ii) the secure token, where the demand response control event is usable by the device to generate at least one demand response control event command for the set of endpoints, and the secure token is usable by at least a first endpoint in the set of endpoints to validate the demand response control event command.

12. The one or more non-transitory computer-readable media of clause 11, where the device is in a second network distinct from the secured network, the secured network complies with a first security policy, and the second network complies with a second security policy different from the first security policy.

13. The one or more non-transitory computer-readable media of clause 11 or 12, where the message is usable by the device in the second network to authenticate the indicator of the demand response control event, identify, from the indicator of the demand response control event, one or more power control actions corresponding to the set of endpoints, and generate the at least one demand event command, wherein the at least one demand event command specifies at least a first power control action.

14. The one or more non-transitory computer-readable media of any of clauses 11-13, where the operator is authenticated using a set of biometric data provided by the operator.

15. In various embodiments, a system comprising a secured computing environment including a first computing system that validates a request associated with a demand event generated by an operator, where (i) the operator is authenticated to generate demand events within the secured computing environment, and (ii) the demand event corresponds to a set of endpoints operating outside the secured computing environment, generates an authorization permit associated with the demand event, and sends, to a second computing system outside of the secured computing environment, (i) an indicator of the demand event, and (ii) the authorization permit, where the demand event is usable by the second computing system to generate a first demand event command for the set of endpoints, and the authorization permit is usable by the set of endpoints to authenticate the first demand event command.

16. The system of clause 15, where the second computing system is located in a second computing environment distinct from the secured computing environment, and the second computing system receives a message including the indicator of the demand event, authenticates the indicator of the demand event identifies, from the indicator of the demand event, a set of power control actions corresponding to the set of endpoints, and generates, based on the set of power control actions, a set of demand event commands, wherein the set of demand event commands includes the first demand event command.

17. The system of clause 15 or 16, where the set of demand event commands comprises respective commands for respective endpoints in the set of endpoints.

18. The system of any of clauses 15-17, where the first demand event command and the authorization permit are usable by a first endpoint included in the set of endpoints to validate, based on the authorization permit, the first demand event command, and control power consumption of an electrical load coupled to the first endpoint based on the first demand event command.

19. The system of any of clauses 15-18, where the first endpoint includes a switch connecting a power circuit electrical load to a power supply, and the first demand event command instructs to first endpoint to perform the power control action by altering the switch to disconnect the power circuit from the power supply.

20. The system of any of clauses 15-19, where to validate the request associated with the demand event generated, the first computing system compares the request to at least a first demand event policy, determines that the request adheres to the first demand event policy, and generates the demand event based on the request.

Any and all combinations of any of the claim elements recited in any of the claims and/or any elements described in this application, in any fashion, fall within the contemplated scope of the present invention and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
    validating, by a first computing system in a secured computing environment, a demand event generated by an operator, wherein:
        the operator is authenticated to generate demand events within the secured computing environment; and
        the demand event corresponds to a set of endpoints operating outside the secured computing environment;
    generating, by the first computing system, an authorization permit associated with the demand event; and
    sending, from the first computing system to a second computing system outside of the secured computing environment, (i) an indicator of the demand event, and (ii) the authorization permit, wherein:
        the indicator of the demand event is usable by the second computing system to generate a demand event command for the set of endpoints, and
        the authorization permit is usable by the set of endpoints to validate the demand event command.

2. The method of claim 1, wherein:
    the second computing system is in a second computing environment distinct from the secured computing environment;
    the secured computing environment satisfies a first security policy; and
    the second computing environment satisfies a second security policy different from the first security policy.

3. The method of claim 2, wherein the first security policy includes:
    a first set of electronic security requirements for the secured computing environment; and
    a first set of physical security requirements for one or more devices included in the secured computing environment.

4. The method of claim 1, wherein the operator is authenticated using a set of biometric data provided by the operator.

5. The method of claim 1, wherein:
    a subset of the set of endpoints are respectively coupled to a set of power-consuming devices; and
    the subset of the set of endpoints are operable to reduce electrical power consumed by the set of power-consuming devices during the demand event.

6. The method of claim 1, wherein validating the demand event generated by the operator comprises:
    receiving a request to generate the demand event;
    comparing the request to at least a first demand event policy;
    determining that the request adheres to the first demand event policy; and
    generating the demand event based on the request.

7. The method of claim 6, wherein the first demand event policy specifies a maximum threshold for a reduction of power demand within a specified period.

8. The method of claim 1, further comprising:
    before transmitting the indicator of the demand event, signing, by the first computing system using a first private key, the indicator of the demand event; and
    before transmitting the authorization permit, signing, by the first computing system using the first private key or a second private key, the authorization permit.

9. The method of claim 8, wherein a first public key corresponding to the first private key is usable by at least one of the second computing system or the set of endpoints to authenticate at least one of the signed indicator or the signed authorization permit.

10. The method of claim 1, wherein the authorization permit includes at least one of an identifier of an endpoint device in the set of endpoint devices, a start time for the demand event, a duration of the demand event, or an identifier of the first computing system.

11. One or more non-transitory computer-readable media storing instruction that, when executed by one or more processors, cause the one or more processors to perform the steps of:
    authenticating, by a first server within a secured network, an operator, wherein an authenticated operator is authorized to generate one or more demand response control events within the secured network;
    validating, by the first server, a demand response control event request generated by an operator, wherein the demand response control event request specifies one or more power load modifications by a set of endpoints operating outside the secured network;
    signing, by the first server, an authorization permit associated with a demand response control event corresponding to the demand response control event request, wherein signing the authorization permit generates a secure token; and sending, from the first server to a device outside of the secured network, a message including (i) an indicator of the demand response control event, and (ii) the secure token, wherein:
  the indicator of the demand response control event is usable by the device to generate at least one demand response control event command for the set of endpoints, and
  the secure token is usable by at least a first endpoint in the set of endpoints to validate the demand response control event command.

12. The one or more non-transitory computer-readable media of claim 11, wherein:
  the device is in a second network distinct from the secured network;
  the secured network complies with a first security policy; and
  the second network complies with a second security policy different from the first security policy.

13. The one or more non-transitory computer-readable media of claim 12, wherein the message is usable by the device in the second network to:
  authenticate the indicator of the demand response control event;
  identify, from the indicator of the demand response control event, one or more power control actions corresponding to the set of endpoints; and
  generate the at least one demand event command, wherein the at least one demand event command specifies at least a first power control action.

14. The one or more non-transitory computer-readable media of claim 11, wherein the operator is authenticated using a set of biometric data provided by the operator.

15. A system comprising:
  a secured computing environment including a first computing system that:
    validates a request associated with a demand event generated by an operator, wherein (i) the operator is authenticated to generate demand events within the secured computing environment, and (ii) the demand event corresponds to a set of endpoints operating outside the secured computing environment;
    generates an authorization permit associated with the demand event; and
    sends, to a second computing system outside of the secured computing environment, (i) an indicator of the demand event, and (ii) the authorization permit, wherein:
      the indicator of the demand event is usable by the second computing system to generate a first demand event command for the set of endpoints, and
      the authorization permit is usable by the set of endpoints to authenticate the first demand event command.

16. The system of claim 15, wherein:
  the second computing system is located in a second computing environment distinct from the secured computing environment; and
  the second computing system:
    receives a message including the indicator of the demand event;
    authenticates the indicator of the demand event;
    identifies, from the indicator of the demand event, a set of power control actions corresponding to the set of endpoints; and
    generates, based on the set of power control actions, a set of demand event commands, wherein the set of demand event commands includes the first demand event command.

17. The system of claim 16, wherein the set of demand event commands comprises respective commands for respective endpoints in the set of endpoints.

18. The system of claim 16, wherein the first demand event command and the authorization permit are usable by a first endpoint included in the set of endpoints to:
  validate, based on the authorization permit, the first demand event command; and
  control power consumption of an electrical load coupled to the first endpoint based on the first demand event command.

19. The system of claim 18, wherein:
  the first endpoint includes a switch connecting a power circuit electrical load to a power supply; and
  the first demand event command instructs to first endpoint to perform the power control action by altering the switch to disconnect the power circuit from the power supply.

20. The system of claim 15, wherein to validate the request associated with the demand event generated, the first computing system:
  compares the request to at least a first demand event policy;
  determines that the request adheres to the first demand event policy; and
  generates the demand event based on the request.

* * * * *